(12) United States Patent
Turover et al.

(10) Patent No.: US 9,682,409 B2
(45) Date of Patent: Jun. 20, 2017

(54) APPARATUS, SYSTEMS AND METHODS FOR CLEANING AN AQUARIUM

(76) Inventors: David Turover, Chicago, IL (US); Craig Wenger, Chicago, IL (US)

( * ) Notice: Subject to any disclaimer, the term of this patent is extended or adjusted under 35 U.S.C. 154(b) by 550 days.

(21) Appl. No.: 13/430,560

(22) Filed: Mar. 26, 2012

(65) Prior Publication Data

US 2012/0325755 A1 Dec. 27, 2012

Related U.S. Application Data

(60) Provisional application No. 61/467,996, filed on Mar. 26, 2011.

(51) Int. Cl.
*B08B 9/08* (2006.01)
*A01K 63/04* (2006.01)
*A01K 63/10* (2017.01)

(52) U.S. Cl.
CPC .............. *B08B 9/08* (2013.01); *A01K 63/045* (2013.01); *A01K 63/10* (2017.01)

(58) Field of Classification Search
CPC ...... B08B 9/08; A01K 63/045; A01K 61/003; A01K 63/10
USPC .......................... 210/167.23, 416.2; 119/259
See application file for complete search history.

(56) References Cited

U.S. PATENT DOCUMENTS

| | | | |
|---|---|---|---|
| 2,730,496 A * | 1/1956 | Zavod ...................... | 210/167.23 |
| 3,722,685 A | 3/1973 | Orensten et al. | |
| 3,864,261 A * | 2/1975 | Masterjoseph ............... | 210/163 |
| 4,098,230 A | 7/1978 | Jackson | |
| 4,101,607 A * | 7/1978 | Bart ..................... | B01F 3/04099 |
| | | | 119/263 |
| 4,123,359 A * | 10/1978 | Smith .................. | A01K 63/045 |
| | | | 210/167.22 |
| 4,148,730 A * | 4/1979 | Willinger ............. | A01K 63/045 |
| | | | 210/167.23 |
| 4,216,090 A * | 8/1980 | Dockery .................. | 210/167.23 |
| 4,268,387 A * | 5/1981 | Hall ......................... | 210/167.23 |
| 4,512,885 A | 4/1985 | Willinger | |
| 4,693,817 A * | 9/1987 | Goldman et al. ........ | 210/167.23 |
| 4,915,828 A | 4/1990 | Meyers et al. | |
| 4,921,614 A * | 5/1990 | Frickman ............. | A01K 63/045 |
| | | | 119/264 |
| 4,957,623 A | 9/1990 | Henzlik | |
| 4,978,444 A | 12/1990 | Rommel | |
| 5,098,585 A | 3/1992 | Woltman et al. | |

(Continued)

FOREIGN PATENT DOCUMENTS

DE 102005030782 A1 1/2007
EP 1321031 A2 6/2003

OTHER PUBLICATIONS

International Search Report and Written Opinion of the International Searching Authority for copending Int'l App. No. PCT/US12/30625, dated Nov. 27, 2012.

(Continued)

*Primary Examiner* — Fred Prince
(74) *Attorney, Agent, or Firm* — Scherrer Patent & Trademark Law, P.C.; Stephen T. Scherrer; Monique A. Morneault

(57) ABSTRACT

Apparatuses, systems and methods aid in the cleaning of an aquarium and provide clean water to an aquarium. In particular, the present invention relates to an efficient, self-contained and simplified solution for cleaning aquarium tanks and replenishing clean water to an aquarium.

17 Claims, 30 Drawing Sheets

(56) References Cited

U.S. PATENT DOCUMENTS

| | | | |
|---|---|---|---|
| 5,131,821 A * | 7/1992 | Marioni et al. | 417/423.3 |
| 5,160,431 A * | 11/1992 | Marioni | 210/167.23 |
| 5,171,438 A | 12/1992 | Korcz | |
| 5,199,378 A | 4/1993 | Kissick | |
| 5,240,596 A | 8/1993 | Chesnut | |
| 5,269,914 A * | 12/1993 | Englert | 210/151 |
| 5,306,421 A | 4/1994 | Weinstein | |
| 5,640,930 A | 6/1997 | Kirby | |
| 5,783,070 A * | 7/1998 | Lee | 210/167.21 |
| 6,007,713 A * | 12/1999 | Michalik | 210/167.23 |
| 6,533,928 B1 | 3/2003 | Terato | |
| 6,706,176 B1 | 3/2004 | Goldman | |
| 6,755,981 B2 | 6/2004 | Terato | |
| 6,797,163 B2 | 9/2004 | Carley et al. | |
| 6,843,909 B1 | 1/2005 | Woltmann | |
| 7,429,321 B2 | 9/2008 | Willinger | |
| 8,506,811 B2 * | 8/2013 | Bradley | A01K 63/04 119/227 |
| 2007/0051320 A1 | 3/2007 | Yen | |
| 2007/0119381 A1 | 5/2007 | Chang | |
| 2009/0126645 A1 | 5/2009 | Tsai | |

OTHER PUBLICATIONS

International Search Report and Written Opinion of the International Searching Authority for copending Int'l App. No. PCT/US12/70137, dated Nov. 27, 2012.

European Search Report and European Search Opinion for copending Int'l App. No. PCT/US12/30625, dated Aug. 6, 2014.

* cited by examiner

Master Control Center (MCC) Valve Settings & Instructions:
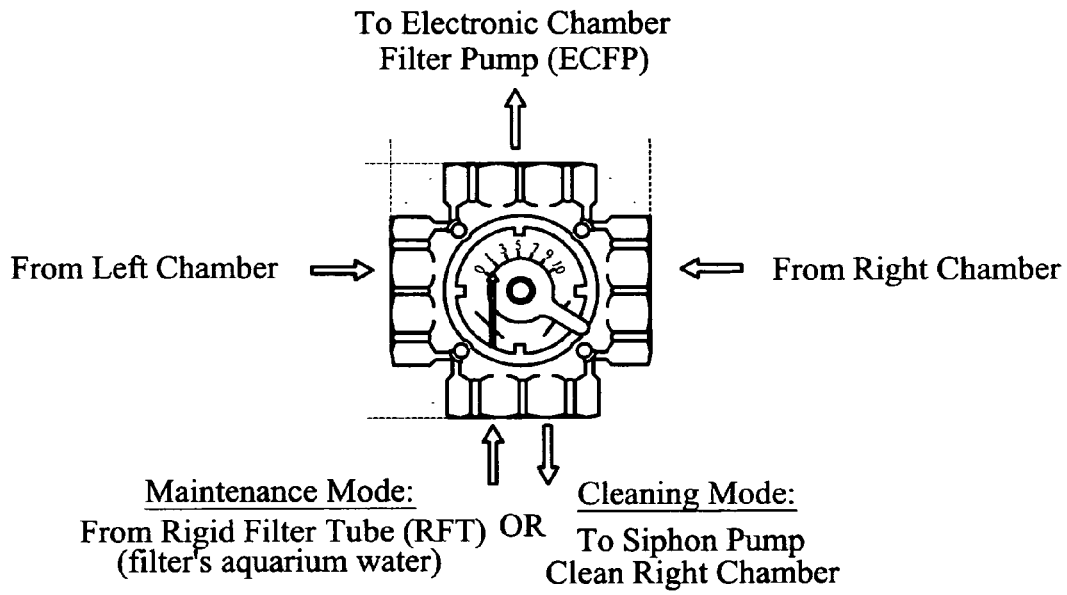
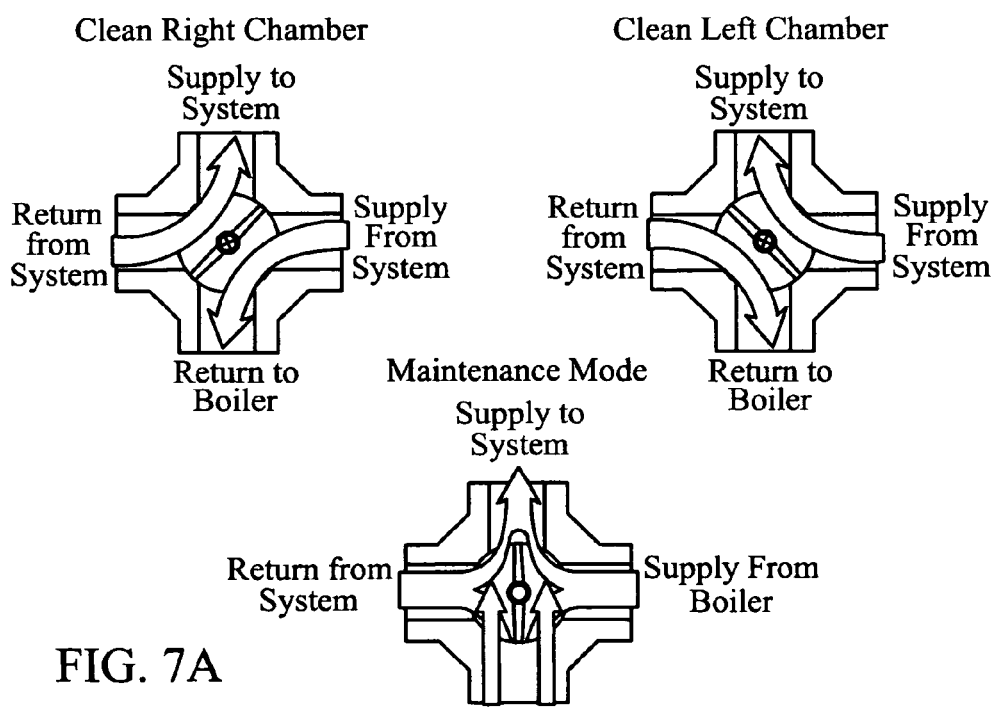
FIG. 7A Master Control Center (MCC) Valve Settings & Instructions:

Maintenance Mode:

Valve set 5: water is drawn into the filter pump evenly from both chambers and aquarium RFT.

Valve set 1-4: Increases water flow from right chamber and decreases flow from left chamber and RFT

Valve set 0: Only filters right chamber.

Valve set 6-9: Increases water flow from left chamber and decreases flow from right chamber and RFT

Valve set 10: Only filters left chamber.

Cleaning Mode Settings & Instruction:

1. Unscrew RFT from MCC valve. Screw the siphon pump extendsion hose into the MCC valve.

2. Turn the MCC valve to 0. This setting will clean the left chamber.

3. Start siphon and begin to fill 5 gallon bucket.

4. When the water reaches the top of the bucket. shut off the siphon valve.

5. Place siphon hose into empty 5 gallon bucket.

7. Open the siphon valve to resume cleaning. When bucket is nearly full pull siphon starter. pump off the siphon pump to stop siphon and clear all tubes / hoses of water.

8. Unscrew the siphon extension hose and screw on the RFT. Turn MCC vavle to your desired maintenance mode setting.

FIG. 7B

APPARATUS, SYSTEMS AND METHODS FOR CLEANING AN AQUARIUM

The present invention claims priority to U.S. Provisional Patent Application No. 61/467,996, filed Mar. 26, 2011, which is incorporated herein by reference in its entirety.

FIELD OF THE INVENTION

The present invention relates to apparatuses, systems and methods of cleaning an aquarium and providing clean water to an aquarium. Aquarium filter systems are well known in the prior art, as are the processes and assemblies necessary to clean the aquarium and replenish clean water to aquariums. In particular, the present invention relates to an efficient, self-contained and simplified solution for cleaning aquarium tanks and replenishing clean water to an aquarium.

The present invention is made up of modular components. The use of modular components provides for the interlocking of components in a standard size aquarium tank. The Aquarium Cleaning Solution as described herein ("ACS") provides a cleaning process and device for collecting debris from an aquarium, and re-supplying water as necessary to an aquarium. The Aquarium Cleaning Solution provides for minimal intrusion in the aquarium tank in the process of collecting debris and supplying clean water to the aquarium tank. Accordingly, the beauty of the aquarium is maintained and the aquatic life is better able to maintain its vitality.

BACKGROUND

Currently there are a number of solutions for cleaning an aquarium and filtering water in an aquarium, as well as refilling the aquarium tank with clean water. Some solutions attempt to maintain a clean aquatic environment by using several different types of filters, usually mechanical, biological, and chemical filters. The purpose of the mechanical filter is to aerate the existing water, usually by agitation against the mechanical filter. The ability to re-oxidize the water is dependent on the amount of time and contact the aquarium water is able to maintain contact with the mechanical filter. This is typically referred to as "dwell time." The biological filter's aim is to remove bacterial contaminants. These filters reach a threshold and must be replaced when the filter fills up with toxic bacteria. The chemical filters are designed to primarily reduce the ammonia levels. While the biological and chemical filters remove the toxic waste, most of these filters do little more than re-circulate the existing water.

The prior art describes external and internal types of filtration systems. The external filter system generally consists of a pump that is electrically powered, intake and return tubes that circulate the water to and from the filter medium. The filter medium typically consists of packets of material, usually activated charcoal, and must be replaced on a periodic basis. These systems are prone to mechanical breakdown, tend to be fairly large and bulky, thus distracting from the beauty of the aquarium. The internal types of filtration systems provide for a system of having water in the aquarium go through a filter device or devices containing a mechanical, biological, and chemical filter medium. These filters require replacement on a periodic basis. The replacement filters whether in packets or cartridges tend to become expensive over time.

Accordingly, it would be desirable and advantageous to provide aquarium filter devices that require minimal handling, do not require constant replacement of filtration medium, have minimally sized components, a small number of components, and does not distract from the beauty of the aquarium.

Further, a system that is able to clean the aquarium tank, and replenish the aquarium tank with clean water as necessary, and provides better aeration of the aquatic environment is also desirable.

These and other aspects of the invention will become readily apparent from the detailed description, which follows.

SUMMARY OF THE INVENTION

The present invention, the Aquarium Cleaning Solution, advantageously fills the aforementioned deficiencies by providing an aquarium cleaning solution that has minimal components, does not require any replacement packets, and instead of merely re-circulating the existing water, removes debris from the aquarium tank, and provides clean water to the aquarium so that eventually all the water in the aquarium is replaced over time. Further, because there are a minimal number of components to the system, and the components tend to be small in size the beauty of the aquarium is not lost.

The present invention quickly and efficiently cleans an aquarium, and is adaptable because of its modality to accommodate all standard size fish tanks. The system mainly comprises interlocking modular pieces so it is adaptable to many different sizes of aquarium tanks. This system, if properly maintained, can provide a safe aquatic environment for the user for years to come.

The Aquarium Cleaning Solution has, as an object of its invention, to provide a debris-collecting device placed out of sight at the bottom of the aquarium tank.

The Aquarium Cleaning Solution further provides for easy removal of the "dirty" water and refill of the aquarium tank with clean water. The present invention provides for a more appealing experience in the presentation of the user's aquarium. The user is able to operate the Aquarium Cleaning Solution with minimal effort and is able to stay dry during the cleaning process.

The Aquarium Cleaning Solution also has as objects of its invention the ability to save time over conventional cleaning methods and provide for easy operation.

It is still a further object of the Aquarium Cleaning Solution to provide an affordable solution that efficiently cleans an aquarium tank.

One of the objects of the present invention is to eliminate the necessity for carrying heavy buckets of dirty aquarium water during the tank cleaning and during water changes.

The Aquarium Cleaning Solution provides for a safe, secure, and eco-friendly process. The cleaning action takes place in the area defined as the "Chamber", outside of the area available for exposure to the aquatic life. Every component of the Aquarium Cleaning Solution is made of non-toxic, plastic.

The apparatuses, systems and methods of the present invention, also known and described herein as the "Aquarium Cleaning System" ("ACS"), is comprised, generally, of the following components: a Rigid Chamber Tube ("RCT"), the RCT may preferably be a triangular prism-shaped tube with waste removal slits at the base of the tube (in one embodiment). The RCT may be a single piece, a plurality of pieces that are connected together and/or, preferably, telescopic to accommodate various aquarium tank sizes. Although described herein as "triangular prism-shaped", the RCT may be any shape to accomplish the function of removing waste and debris from the Chamber through waste removal slits, as described herein.

The RCT may have end caps or "RCT End Caps" on opposite ends of the triangular prism-shaped tube to prevent water from flowing into the RCT through its ends. At the center of the RCT is a Rigid Chamber Tube Connector ("RCTC"), the RCTC may preferably be the connection point between the RCT and a hose that extends upwardly, called herein the "Multitasking Hose" ("MT"). An RCT Connector Cap ("RCTCap") may be used to seal off the RCTC if the MT is removed from the RCTC. The RCTCap may restrict the entry of water, debris, or other materials (such as fish or other aquatic life), from entering the RCT if the MT is removed from the RCTC.

In lieu of the RCTCap, the RCTC may have a screen disposed within the RCTC to prevent fish from entering the RCT when the MT is removed from the RCTC. Since a screen may be disposed within the RCTC, the MT may plug into the RCTC directly and securely. The RCTC may have a larger diameter than the RCT where the RCTC is connected to the RCT thereby providing maximum water flow to be maintained despite some of the area within the RCTC being taken up by the screen within the RCTC.

The MT may have two forms. The first form of the MT may be a flexible hose for use in aquarium tanks that may not be of a certain depth. The first MT form may be used to connect an optional Electric Chamber Filter Pump ("ECFP") to the RCT. The first MT form may provide the advantage of connecting the optional Electric Chamber Filter Pump to the RCT. This first MT form may allow the user to position the ECFP anywhere in the aquarium and remain operational. The second form for the MT may be for aquariums where there is no optional electric chamber filter pump. The MT may preferably not have a continuous connection to the RCT. This second form for the MT may be a rigid tube with a flexible hose attached to the bottom thereof. This design may allow the user to plug the MT into the RCTC without placing their hands in the aquarium. With this MT design, the MT may be plugged directly into the RCT without removing the aquarium hood. Both of the MT designs may be telescopic to accommodate various aquarium tank dimensions and may serve as conduit to transfer the water and debris from the RCT to a Siphon Pump ("SP").

The Siphon Pump ("SP") may transfer water and waste from the MT to a location, preferably, out of the aquarium. In one embodiment, the SP may transfer water and waste from the MT to a bucket. In operation, the SP may draw the water and waste out of the chamber (via the RCT), through the MT and into the bucket. The MT may, in one embodiment, follow a diagonal path from the RCT to the SP, providing for the shortest distance and the most efficient operation of the SP. Specifically, as illustrated in FIG. 12, the MT may extend from the SP 28 at a 45-degree angle via a 45-degree coupling 86 and connect to the RCTC 18 through the aquarium. Of course, it should be noted, that the MT may extend from SP at an angle of less than or more than 45 degrees, as apparent to one of ordinary skill in the art. In addition, a flexible hose may connect the MT to the SP so that various angles may be utilized as necessary.

A Grill ("Grill") may be placed on the aquarium tank bottom over the region defined as the Chamber. The Grill may preferably be a screen, and generally may have holes sized to prevent gravel from traveling through into the Chamber but sufficient to allow the debris to pass into the Chamber. Specifically, the area defined as the Chamber, may be defined as the space between the bottom of the aquarium tank and the Grill, and the Rigid Chamber Tube may sit therein.

Grill Support Legs ("GSL") may raise the Grill slightly off the aquarium tank floor thereby forming the Chamber area. The Grill Support Legs may be either fixed in place on the Grill or snapped on to the Grill in specific locations. The Grill may be a single unit or comprised of modular pieces fitted together to form a single unit that covers the aquarium tank floor. The Grill also may be shaped to fit aquarium tanks with different configurations. The Grill may be both strong and thick enough to hold the weight of the gravel above it, and any tank ornaments without warping or sagging. The Grill's perimeter may be sloped downwards, touching the aquarium tank floor on its outer edge. The gravel on the Grill may then appear to be resting on the aquarium tank floor at its outer edge, such as near the glass sides of the aquarium creating the illusion that the grill is not present. The ACS, thus, may not be readily apparent, as the sloping of the Grill's perimeter may hide the Chamber created. At the outer-edge of the Grill, the sloped perimeter may have a Flexible Gasket ("FG") that may meet the tank walls and may prevent gravel and other unwanted objects from entering the Chamber. In one embodiment, the Grill may consist of three (3) components, which may be defined by their shape. The Grill may consist of the following: A Middle Modular Grill component ("MMG"), which has no slope or walls (a flat top); a Corner Modular Grill component ("CMG"), which may have two (2) vertical sides and two (2) sloped slide sides at the corners of the Grill, (typically four (4) of these grill components are necessary in a square or rectangular shaped tank); and, finally, a Side Modular Grill component, which may have one (1) slope side that is in contact with the glass of the aquarium tank.

Again, the space or area created between the aquarium floor and the Grill is the Chamber. Debris may collect in the Chamber after falling through the gravel on top of the Grill, and then falling through the holes in the Grill. The gravel on top of the Grill may act as a ceiling and may help provide for increased water flow in the Chamber when the Siphon Pump or Electric Chamber Filter Pump is in operation.

A Trap Door ("TD") which is not readily visible under the gravel may have a hinge to allow the Trap Door to open and provide access to the Chamber. The Trap Door may be part of the Middle Modular Grill component. The Trap Door may allow access to the Chamber for adding or removing a Magnetic Floor Scraper ("MFS").

A Siphon Pump may be a manual pump to help force the flow of the debris and waste into the bucket through the various tubing, initially through the Rigid Chamber Tube, and then the MT, and finally through the Siphon Pump and into the Bucket. The diameters of each of these tubes may be congruous to allow for the optimized flow of water.

The SP is affixed to the side of the aquarium tank, or the aquarium tank framing when the SP is in use in the ACS system. Tank Clamps ("TC") may be clamps with a small rubber pad, where the rubber pad may be connected to the TC where the TC attaches to the aquarium tank. Therefore, the TC may provide the SP with a firm attachment to the aquarium tank while providing a protective covering to prevent scratching of the aquarium tank walls. As an alternative, an L-shaped bracket can be used to hang the SP on the side of the aquarium. The SP may be used during the cleaning mode or gravel vacuum mode, as will be described below in further embodiments. The SP functions to remove water and debris from the aquarium tank.

The siphon used to clean the aquarium tank, in the embodiments described herein, may be started using a Siphon Starter Pump ("SSP") that may sit atop the SP and may be used in combination with a shut-off valve to manually start the siphon and begin the siphoning process. Generally, the shut-off valve may be disposed upstream from the SP, and may provide control of the siphon, either to start the siphon or to shut the siphon off once started. The Siphon Starter Pump may work by displacing air from the SP and the MT. A check valve may also be used in conjunction with the Siphon Starter Pump to prevent air from leaking back into the MT or SP, when the SP is operation. Manually priming the Siphon Starter Pump may cause the water to fill the MT and the upper portion of a Siphon Hose ("SH") that may extend from the SP above the closed shut-off valve, to create the conditions necessary to start the siphoning process. After the SP is primed using the SSP, the shut-off valve may be opened, and the water and waste in the Chamber may flow through the shut-off valve and the lower portion of the Siphon Hose and collect in a bucket. A globe valve may be utilized instead of the shut off valve providing control over the water flow velocity when the ACS is in cleaning mode or gravel vacuum mode. A Siphon Junction may be utilized to provide the user with additional options to orient different horizontal and vertical pump positions. The Siphon Junction orientation is preferably important for commercial applications where tanks may be stacked on top of each other. Thus, the SJ orientation may allow the pump to be operated in any circumstance. Extensions of the Siphon Hose may be attached at the bottom of the Siphon Pump with a straight coupling. The extensions of the Siphon Hose may provide sufficient length so the Siphon Pump can be made long enough to reach the bucket irrespective of the height of the aquarium tank.

Another alternative may be a telescopic rigid siphon extension tube that can be used where the heights of aquariums may vary.

The SP may utilize different types of couplings for different purposes as defined below.

Straight Coupling: This type of coupling may be used to extend the length of the Siphon Hose or MT. It may also connect the SP to the MT. This type of coupling may be used in conjunction with the Gravel Vacuum accessories, as described below.

45-Degree Coupling: This type of coupling may be used to extend the length of the Siphon Hose and the MT. It may also serve to connect the SP to the MT. This type of coupling, when attached to the Siphon Junction, may provide the optimal angle for the most direct flow of water from the RCT to the Siphon Pump via the MT. This may insure optimal water flow when operating the Siphon Pump. This type of coupling may also be used in conjunction with the Gravel Vacuum accessories, as described in more detail below.

90-Degree Coupling: This type of coupling may be used to extend the length of the Siphon Hose and MT. It may also be used to change the orientation of the Siphon Starter Pump from vertical to horizontal. This type of coupling may also be used in conjunction with the Gravel Vacuum accessories, as described below.

The Siphon Junction may be the point where the MT, the Siphon Starter Pump, and the upper portion of the Siphon Hose meet.

The MT may plug into the 45-Degree Coupling located on the Siphon Junction when the Siphon Pump is in operation. The MT may also be plugged directly into the Siphon Junction. The 45-Degree coupling may not be required for either setup.

Optionally, a Gravel Rake may be included in the system to help agitate and loosen debris trapped within the gravel, to help the debris fall through the grill and to the bottom of the aquarium tank.

Referring to FIG. 7, an Electric Chamber Filter Pump ("ECFP") may also be included to help generate the flow of water and debris through the gravel and into the Chamber. Specifically, the ECFP may be a combination filter and pump assembly that may recirculate the filtered water back into the aquarium after removal from the RCT or via the Gravel Vacuum apparatus, as described below. One purpose of the bucket is to allow the user to remove water and waste from the tank without any lifting or spilling. The bucket may be sized in various sizes to accommodate different sized tanks. The bucket may be on wheels for easy mobility. The Cord Reel ("CR") may be located on the side of the bucket. The CR may store and organize the water pump cord when not in use and may prevent the cord from tangling. The CR may simply coil up the cord. The top of the bucket may have a lid with an opening located near the side. A hole in the lid may be sufficiently sized to let the bottom of the Siphon Pump in and let enough air-pressure out for proper function of the siphon. The lid may be removable and may be used to keep water from spilling or splashing while cleaning the tank. When the Siphon Pump is not in use, the hole in the lid may be plugged to prevent water from spilling or splashing while transporting or storing the bucket. The lid may be transparent so the user can see the water level. The bottom of the Siphon Pump may slide down into the bucket. The bottom of the bucket may be angled to create a "Collection Point" ("CP") for all the water.

Water may be removed from the bucket in one of three methods. The first method may be through a spigot located at the bottom of the bucket. In the second method, the water may be removed from the bucket with a water aspirator pump. The aspirator pump may be connected to the sink with a first end of a Hose (regular or coiled) continuing from the aspirator to the other or distal end of the hose, which may be screwed into the outside of the Hose Connector, the Hose Connector may be located near the top of the bucket wall, inside of the bucket. A second hose or tube, called the Inner Bucket Hose ("IBH"), may have a first end connected to the Hose Connector. The second end of the Inner Bucket Hose ("INH") may be positioned in the Collection Point. When the water aspirator pump is activated, the bucket may begin to drain into the sink.

To fill the tank with water, one may simply unscrew the hose from the bucket and place it in the aquarium tank, close the aspirator pump, and the clean water from the faucet or other source may flow through the hose and into the aquarium tank.

The third way to remove water from the bucket and refill the aquarium tank may be with a water pump. The water pump may be installed at the Collection Point and may be connected to the Inner Bucket Hose ("INH"). The opposite end of the INH may be connected to the hose connector located on the inside of the bucket. A first end of a regular hose may be screwed into the outside of the Hose Connector. The second end of this hose may be placed in a sink, toilet, flowerpot, garden, or wherever the user may want to dispose of the dirty water. A power cord may run from the water pump and may exit the bucket just under the lid. The remainder of this cord may be stored in the Cord Reel until such time one is to begin pumping water out of the bucket.

When the power cord is plugged into a power source, it may begin to pump water out of the bucket through the INH and then through the regular hose. When the bucket is empty, the pump may automatically stop.

To refill the tank using this method, a first end of a regular hose may be screwed onto the sink faucet, which may be fitted with a hose adaptor, and the second end of the regular hose may be screwed in to the hose connector in the bucket wall. When the sink faucet is turned on, the water from the faucet may fill the bucket. To refill the tank, one may simply unscrew the hose from the sink faucet, and may place this first end of the regular hose inside of the aquarium tank and plug the water pump into a power source.

A battery operated water pump may be used to perform these functions for greater mobility. A Water Redirection Cone ("WRC") may be screwed onto the end of the hose to evenly disperse water into the tank. The WRC may disperse the water in 360 degrees, so the gravel or tank ornaments may not be disturbed.

Alternatively, there may be a bucket design for commercial applications. This alternative bucket design may be useful in commercial environments where tanks that are at different heights need to be cleaned, and the environment requires that no water spills occur. This alternative bucket design may be larger than the regular bucket used. This alternative bucket design may also be used for consumers who have very large aquarium tanks.

For this alternative bucket design, a Rigid Siphon Tube may be used in place of the Siphon Hose (lower). One purpose of this Rigid Siphon Tube may be to ensure that the Siphon Pump never leaves the bucket during operation. The Rigid Siphon Tube may be plugged into the bottom socket of the Shut off Valve. A larger rigid tube may be affixed to the inside wall of the bucket. This larger rigid tube may be called the Rigid Bucket Tube. The Rigid Bucket Tube may be sized so the Rigid Siphon Tube may fit into it telescopically. The Rigid Bucket Tube may stick out of the top of the lid through an opening. Attached to the bottom of the Rigid Bucket Tube may be a T Connector. One end of the T Connector may be attached to the Rigid Bucket Tube. The other two ends of the T Connector may be open so the water flow is unimpeded out of the Rigid Bucket Tube and into the bucket. The T connector may rest at the bottom of the bucket.

This design may allow the user to clean tanks of different sizes and with different heights of the aquarium walls while preventing the bottom of the siphon from inadvertently slipping out of the bucket. A Lid Opening towards the center of the bucket lid may be sufficiently sized to hold the Siphon Pump for secure storage when the Siphon Pump is not in use. Storing the Siphon Pump in the hole of the Lid Opening may block water from inadvertently splashing out of the opening when the bucket is being transported. The Lid Opening may further allow air-pressure out of the bucket during operation, this may be important for the proper function of the Siphon Pump. The other elements of the bucket design, including the collection point, spigot, aspirator pump, water pump, INH, regular hose and hose connectors may also be used in the commercial bucket design.

An optional Gravel Vacuum System may also be available to allow users to vacuum debris from the aquarium tank using the Siphon Pump and MT.

Tank Support Legs or a Base may support the aquarium tank.

Further objectives and advantages of the present invention will become apparent from a careful reading of the detailed description provided below.

BRIEF DESCRIPTION OF THE DRAWINGS

The following figures represent exemplary particular embodiments of the present invention.

FIGS. 7A-7B illustrate a diagram of a Master Control Center (MCC) Valve Settings & Instructions, in an embodiment of the present invention.

DETAILED DESCRIPTION OF THE PRESENTLY PREFERRED EMBODIMENTS

The Aquarium Cleaning Solution, in an embodiment of the present invention, comprises a total cleaning solution for an aquarium. The ACS provides an apparatus, system and method, including a systematic procedure that can be driven by either manual energy or electric energy, depending on the user's preference.

Figure 1:
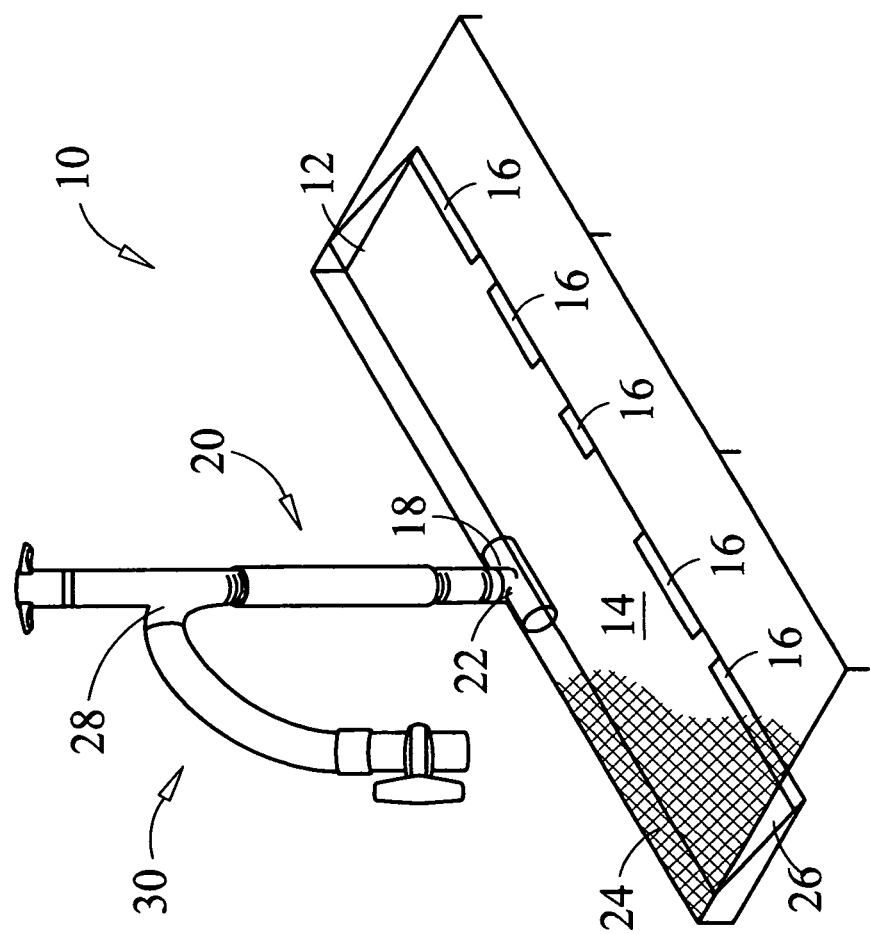
FIG. 1 is a perspective view of the Aquarium Cleaning Solution and components thereof in an embodiment of the present invention.
Figure 2:
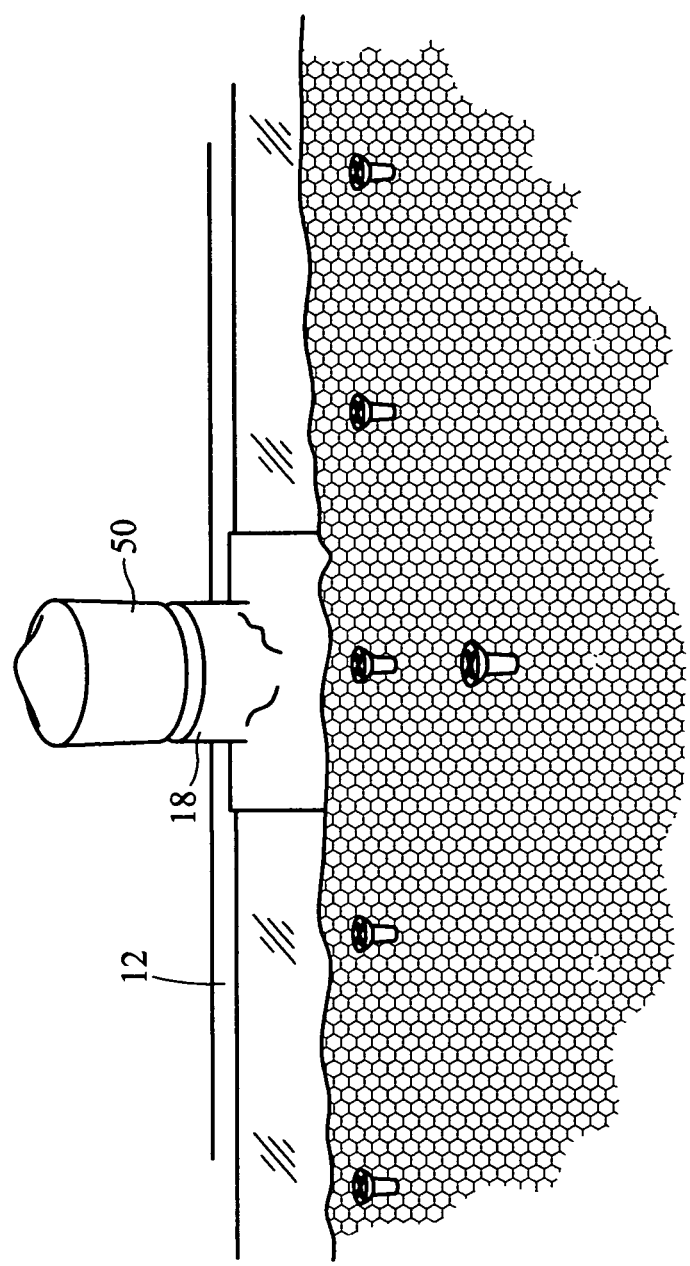
FIG. 2 illustrates a connection point between the Rigid Chamber Tube and the Multitasking Hose where a cap may be placed on the Rigid Chamber Tube in an embodiment of the present invention.

Referring to FIG. 1, a system 10 of the present invention is shown. Specifically, the system 10 comprises a Rigid Chamber Tube 12 debris falls on to the Rigid Chamber Tube ("RCT") 12 and the floor of the aquarium 14 through the waste removal slits 16 in the Rigid Chamber Tube 12 to be flushed out of the aquarium system. The Rigid Chamber Tube 12 may be expandable to accommodate various aquarium tank sizes. The Rigid Chamber Tube 12, through its connector, the Rigid Chamber Tube Connector ("RCTC") 18, located at its' center, is connected to the Multitasking Hose 20. If the optional Electric Chamber Filter Pump (not shown) is not in use, the RCTCap 50 (as illustrated in FIG. 2) may be placed on the RCTC 18 to seal off the RCT 12 and prevent the fish from entering the RCT 12. Alternatively, the RCTC 18 may have a slightly larger diameter with a screen disposed therein to prevent the fish from entering the RCT 12. A screen 22 may be disposed within the RCTC 18 to allow the MT 20 to plug into the RCTC 18 directly and securely. In the alternative operation, the larger diameter of the RCTC 18 helps to provide maximum water flow because of the disposition of the screen 22 may takes up some of the corresponding surface area. If the system 10 is using the optional Electric Chamber Filter Pump 60 (as shown in FIG. 4), the MT 20 may be attached to the RCTC 18 and fish cannot enter the RCT 12.

Figure 3:
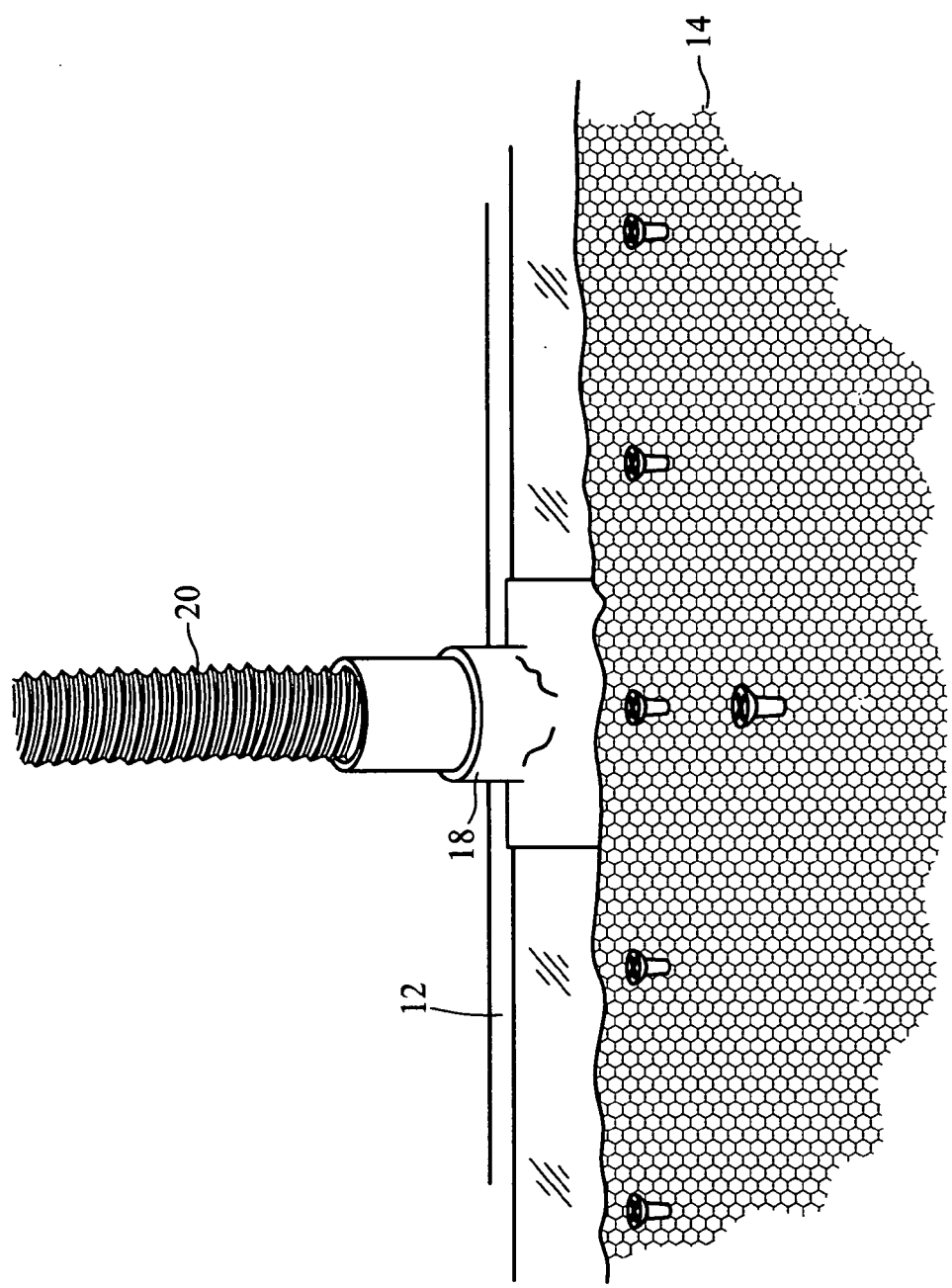
FIG. 3 illustrates a close-up view of the connection point between the Rigid Chamber Tube and the Multitasking Hose, in an embodiment of the present invention.

Referring to FIG. 2, the RCTCap 50 may be provided for the Rigid Chamber Tube 12 when the Rigid Chamber Tube 12 is not connected to the Siphon Pump 28 or the MT 20 as noted below. Specifically, if the MT 20 is removed from the RCTC 18, the RCTCap may be used to restrict the movement of water and materials down into the RCTC 18 and, by extension, the RCT 12. FIG. 3 illustrates the MT 20 attached to the RCTC 18 during normal operation of the system 10.

Figure 4:
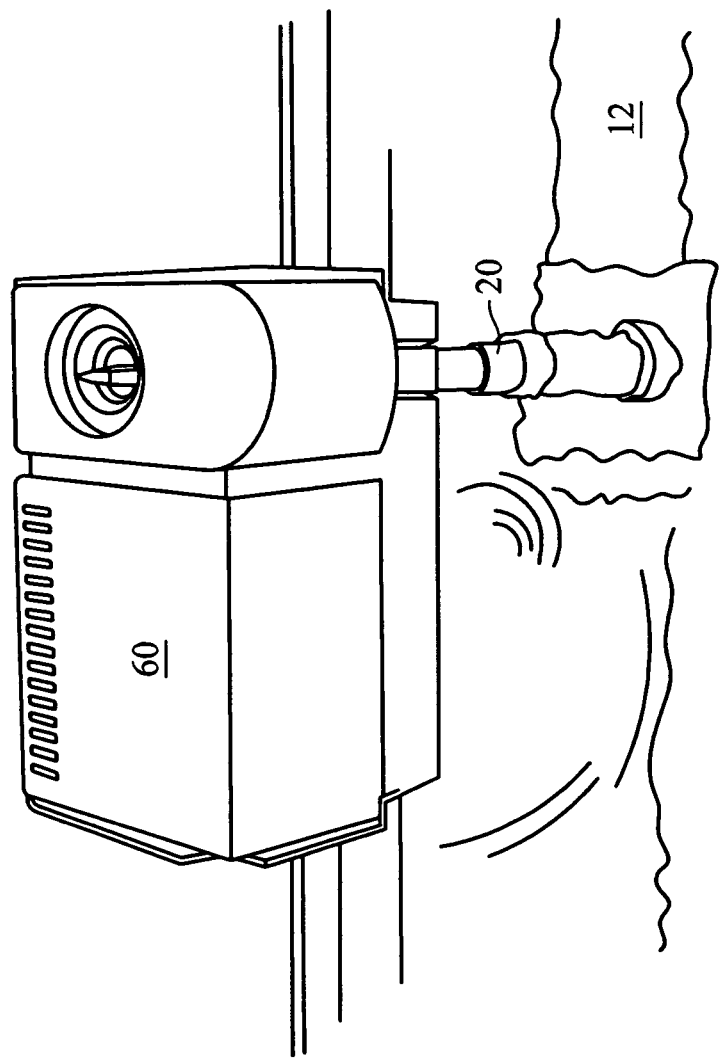
FIG. 4 illustrates a perspective view of an optional Electronic Chamber Filter Pump in an embodiment of the present invention.
Figure 5:
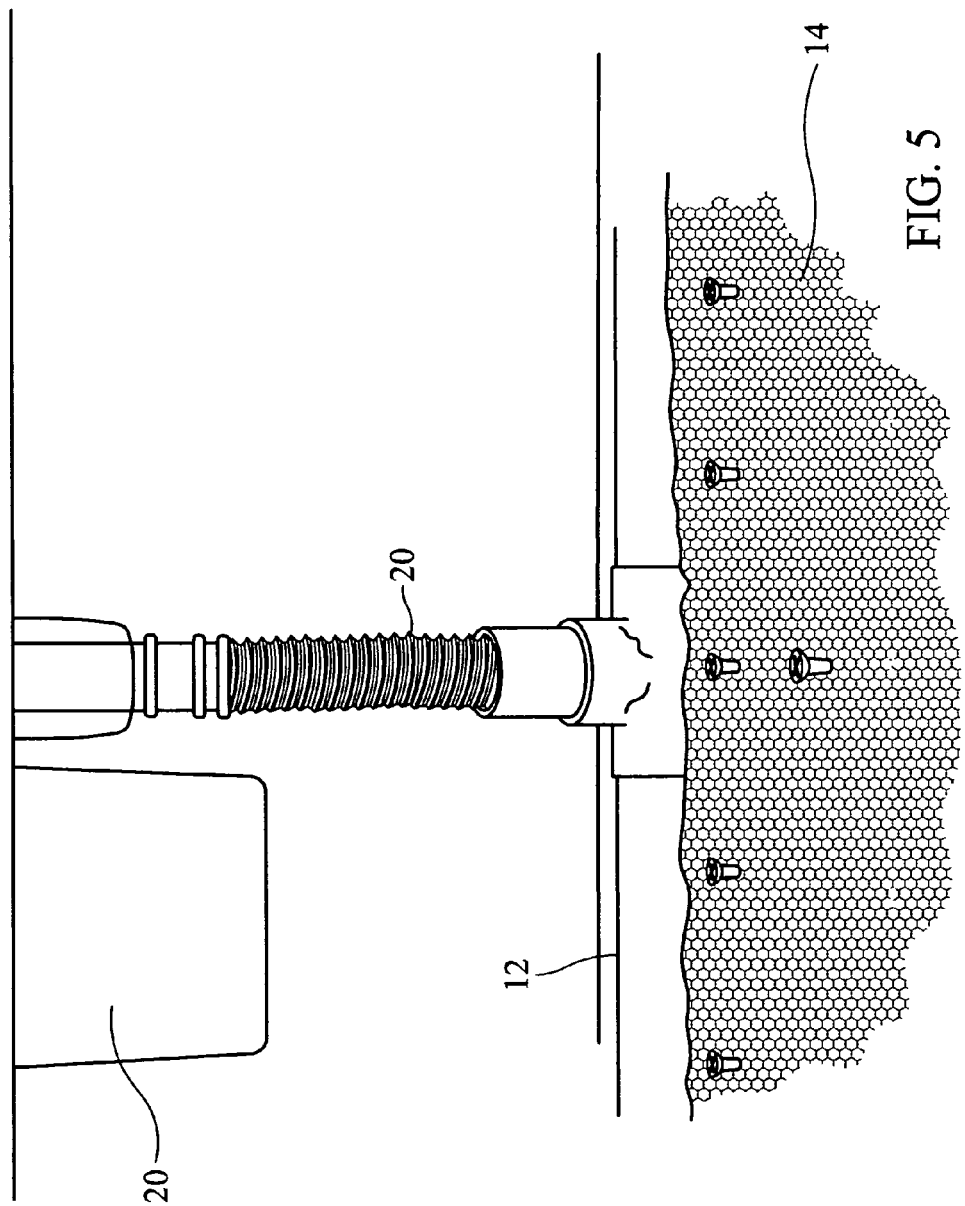
FIG. 5 illustrates a perspective view of the present invention when the set-up is complete, in an embodiment of the present invention.

As illustrated in FIG. 4, when connected to the ECFP 60, the MT 20 may provide for the uptake of debris and the dirty water in the aquarium tank, through the Rigid Chamber Tube 12. The Rigid Chamber Tube 12, with its waste removal slits 16 for the uptake of the debris and dirty water, as shown in FIG. 1, may flow into the Multitasking Hose 20 by means of current caused by an aquarium impeller. The Rigid Chamber Tube 12 may sit on the aquarium floor beneath the Grill 24. At the connection point of the RCT 12 and the MT 20, the Grill 24 may also cover the opening to prevent fish and gravel from entering the RCT 12 or the MT 20. This may be used instead of the RCTCap 50, as shown in FIG. 2.

The MT 20 may act in three capacities. When the system of the present invention are in a normal non-cleaning mode, the MT 20 may be connected to the RCT 12, and the optional Electric Chamber Filter Pump 60, so it may act as a passageway for the constant flow of water and debris from a Chamber 26 formed between the Grill 24 and the aquarium floor, to the Electric Chamber Filter Pump 60 for filtering. The Electric Chamber Filter Pump 60 then delivers the clean water back into the aquarium tank.

Figure 12:
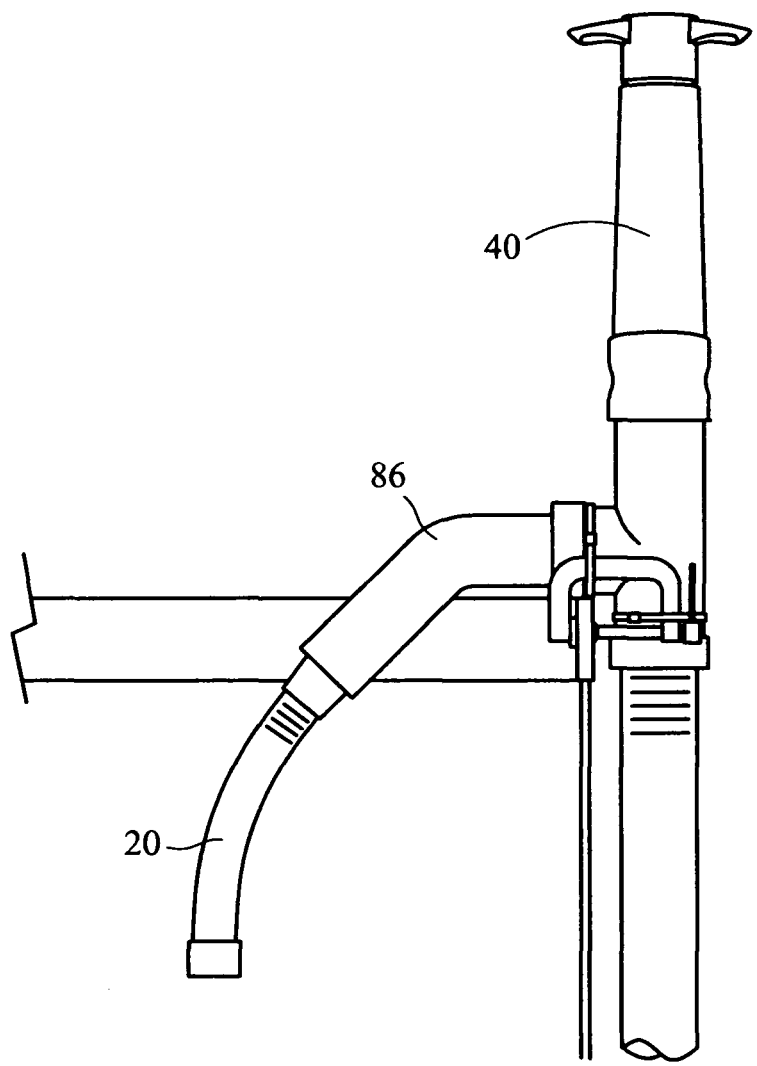
FIG. 12 illustrates a perspective view of a siphon pump attached with a 45-degree coupling in an embodiment of the present invention.

The MT 20 may, in one embodiment, follow a diagonal path from the RCT to the SP, providing for the shortest distance and the most efficient operation of the SP. Specifically, as illustrated in FIG. 12, the MT may extend from the SP 28 at a 45-degree angle via a 45-degree coupling 86 and connect to the RCTC 18 through the aquarium.

Electric Chamber Filter Pump 60 ("ECFP") (Optional): An electrical aquarium pump 60 may be attached to the MT 20 to generate water flow through the gravel into the chamber. This may speed up the process of debris falling through the gravel and into the Chamber 26. Additionally, some of the debris pulled into the Chamber 26 may be pulled through the MT 20 and then through the ECFP 60. There, the water may be filtered of debris and the clean water may flow out of the filter pump back into the top of the tank. Where the debris may be too large or heavy to be pulled into the ECFP 60, this debris may be removed using a Siphon Pump 28 when in chamber cleaning mode.

An additional Filter Pump impeller (not shown) can be built into the ECFP 60 to have it do "double-duty" as an above the gravel, aquarium filter. At the end of the impeller intake tube there may be a bowl shaped piece that may reduce the amount of air bubbles sucked in the filter to reduce filter noise.

A flow adjustment switch (not shown) may allow the user to choose how quickly the Chamber is filtered and eventually the aquarium. The flow adjustment switch may provide for the ability of a singular filter pump to be used in many different aquarium sizes.

When the system 10 is acting in the Chamber Cleaning Mode, the MT 20 may be connected between the RCT 12 and the Siphon Pump 28, the MT 20 may act as the passageway to remove water through the Siphon Pump 28.

The Grill 24 may be expandable or modular to fit various aquarium tank sizes. The Grill 24 in one of its forms may be tapered at its outer edges to eliminate from view the Chamber 26 that may be disposed therebeneath that is formed by the RCT 12. Thus, the view to the spectator may then appear as if the gravel sits directly on the floor of the aquarium tank. The Grill 24 may have holes small enough to prevent the gravel from falling through but large enough to allow waste and debris to flow under the Grill.

Figure 17:
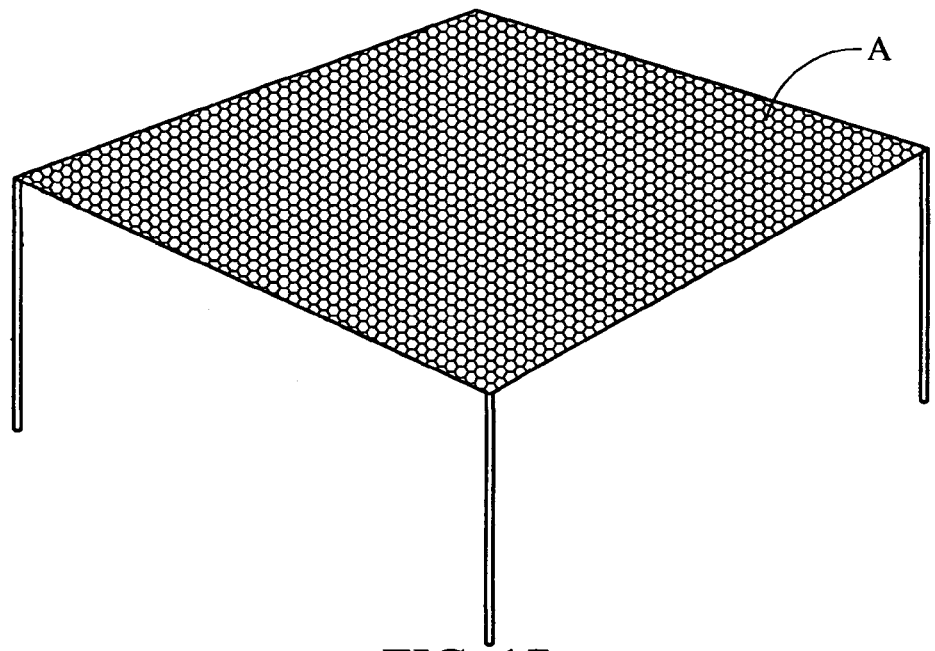
FIG. 17 illustrates a close-up view of a Middle Modular Grill Unit in an embodiment of the present invention.
Figure 18:
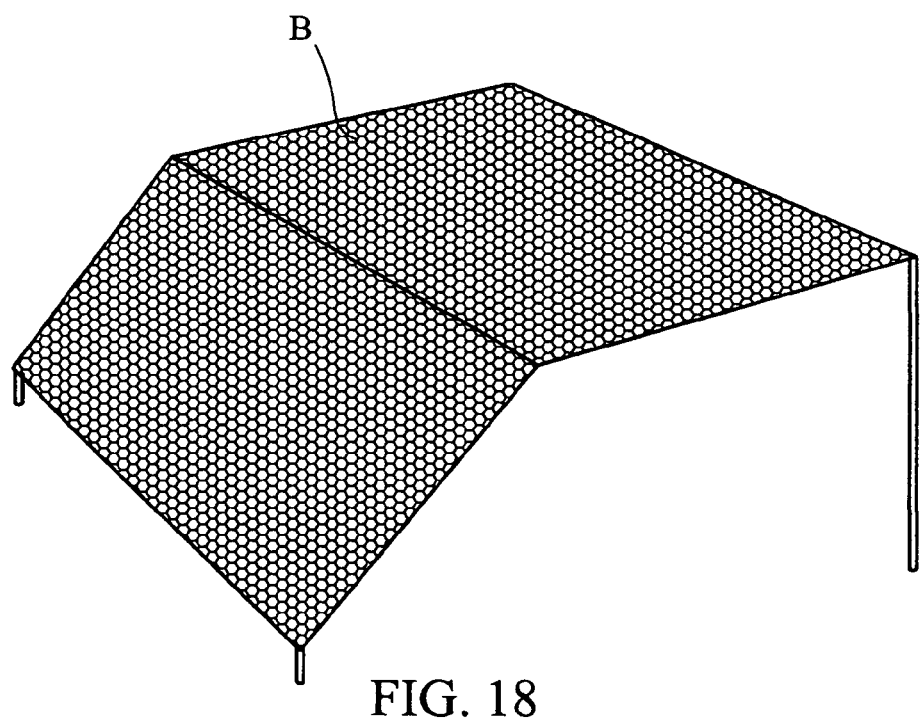
FIG. 18 illustrates a close-up view of a Side Modular Grill Unit in an embodiment of the present invention.
Figure 19:
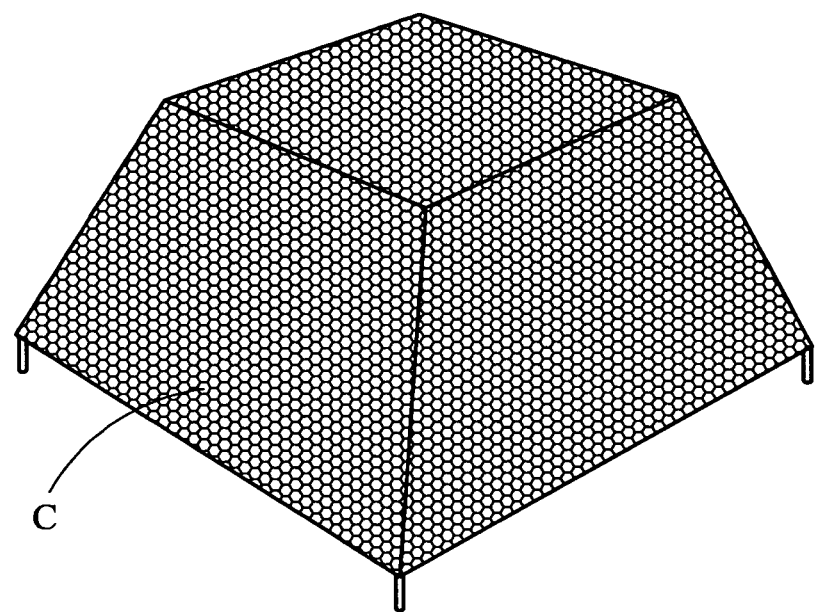
FIG. 19 illustrates a close-up view of a Corner Modular Grill Unit in an embodiment of the present invention.
Figure 20:
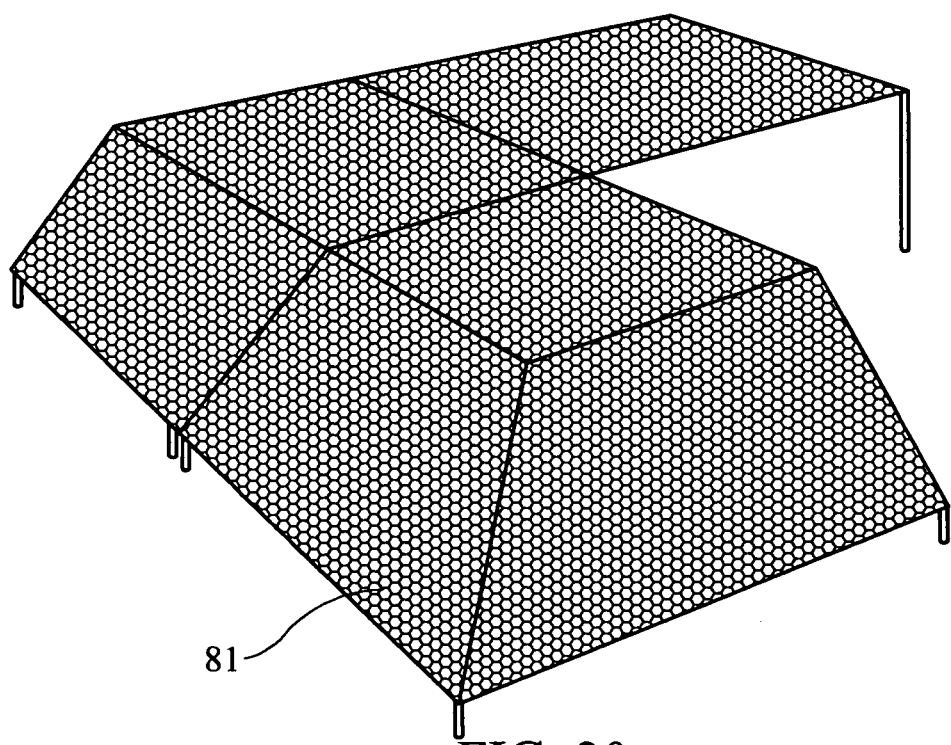
FIG. 20 illustrates a close-up view of a partially constructed modular grill in an embodiment of the present invention.
Figure 21:
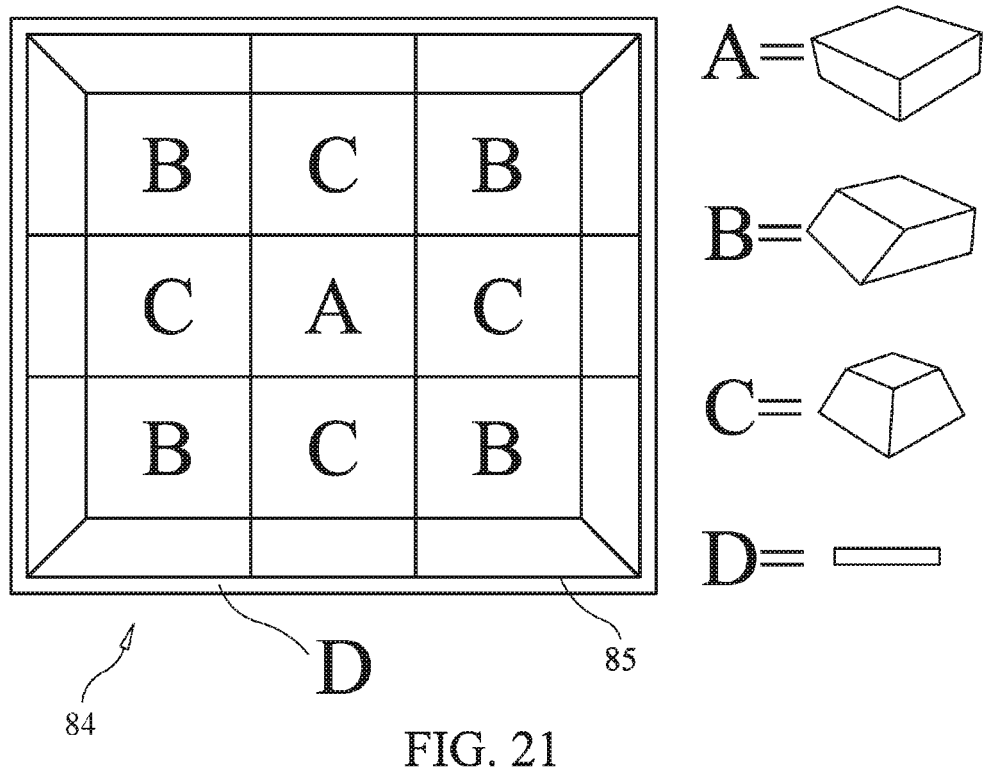
FIG. 21 illustrates a close-up view of a completed modular grill in an embodiment of the present invention.
Figure 22:
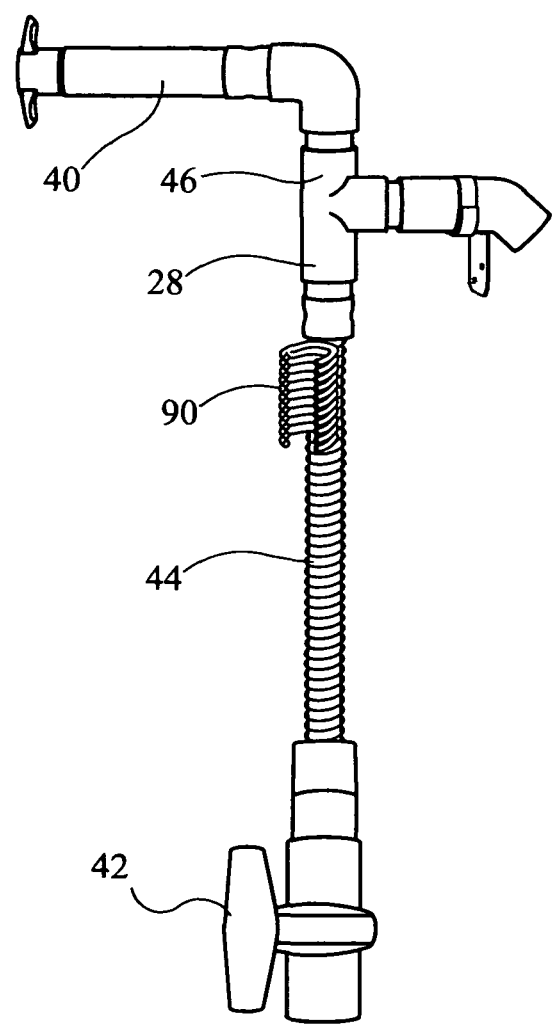
FIG. 22 illustrates an alternate embodiment of a pump configuration in an embodiment of the present invention.

Specifically, FIGS. 17-21 illustrate a specific embodiment of a modular grill 84 that may be utilized for sizing in different sized aquarium tanks. Specifically, the modular grill 84 may include three separate components, a Middle Modular Grill Unit A, a Corner Modular Grill Unit B, and a Side Modular Grill Unit C, which may be formed together to form the entirety of the modular grill 84, as shown in FIG. 21. FIG. 17 illustrates a close-up view of the Middle Modular Grill Unit A, which may merely be rectangular in shape, and may be designed to be disposed within a middle section of the modular grill 84. FIG. 18 illustrates a close-up view of the Side Modular Grill Unit B, which may have a sloped side, the sloped side designed to be located at or near the side of an aquarium to minimize the appearance of the grill 84 within the aquarium. FIG. 19 illustrates a close-up view of the Corner Modular Grill Unit C, which may have two sloped sides to fit in a corner of the aquarium, the sloped sides disposed towards two sides of the aquarium to minimize the appearance of the grill 84 within the aquarium. Taken together, the modular grill 84 may thus be utilized in aquariums of different sizes, and the Grill Units may be swapped to provide the proper sizing. FIG. 20 illustrates a partially constructed modular grill 82. FIG. 21 illustrates an overhead view of the modular grill 84 in one of a plurality of completed forms.

A flexible gasket 85 may be provided along the edges of the Grill Units A, B and C to provide a seal against the aquarium bottom or sides to ensure that material, such as aquatic life or the like, does not have access to the area within the Grill Units A, B and C. As noted above, the area within the grill 84 may be referred to as the Chamber, and may be the area where the waste may collect after falling through the Grill Units A, B and C.

Referring back to FIG. 1, the area or space between the aquarium tank bottom and the Grill created by the Grill Support Legs is referred to as the Chamber 24, which may also include the RCT 12. Plant clips may be attached to the Grill to hold plants securely thereon.

The Siphon Pump 28 may be detached from the MT 20 when the process is complete. Users without the Electric Chamber Filter Pump 60 may remove the MT 20 from the Rigid Chamber Tube Connector 18 so neither the Siphon Pump 28 nor MT will distract from the beauty of the aquarium.

The MT 20 may include a fixed, modular, telescopic and/or flexible hose 30, which accomplishes three vital functions within the Aquarium Cleaning Solution. Depending on the desired function the user wants to perform, the determination of what part of the system 10 the MT 20 may be plugged into is determined by the user. The MT 20 may plug into the system 10 with the assistance of magnetic or other air/watertight connectors. A tight bend radius may allow the MT 20 to provide the following functions (equivalent tubing can also be used).

When connected between the RCT 12 and Electric Chamber Filter Pump 60 the MT 20 may act as a passageway bringing water up from the chamber and through the Electric Chamber Filter Pump 60 to be filtered and delivered back into the tank; When the MT 20 is connected between the RCT 12 and the Siphon Pump 28, it may act as a passageway to remove water via the siphon system. When the MT 20 is connected to the Siphon Pump 28/siphon junction only, the bottom of the MT 20 tube can be used to vacuum the gravel around the tank.

A Hose Manager ("HM") 90 (as illustrated in FIGS. 22-25) may be a flexible U-Shaped piece of plastic slightly larger than the siphon hose. The Hose Manager 90 may be located at the upper portion of the siphon hose 44 just below a Siphon Junction 46 (that provides the connection junction for the Siphon Starter Pump 40, the Siphon Hose 44 and the MT 20 (not shown) and may be used to help coil the SP when not in use. The bottom length of the siphon hose 44 may plug into the Siphon Junction 46. The siphon hose 44 may be coiled to create a "closed system" that neatly secures the Siphon Pump 28 for easy transport and storage, as illustrated in FIGS. 11A-11D.

Figure 13A:
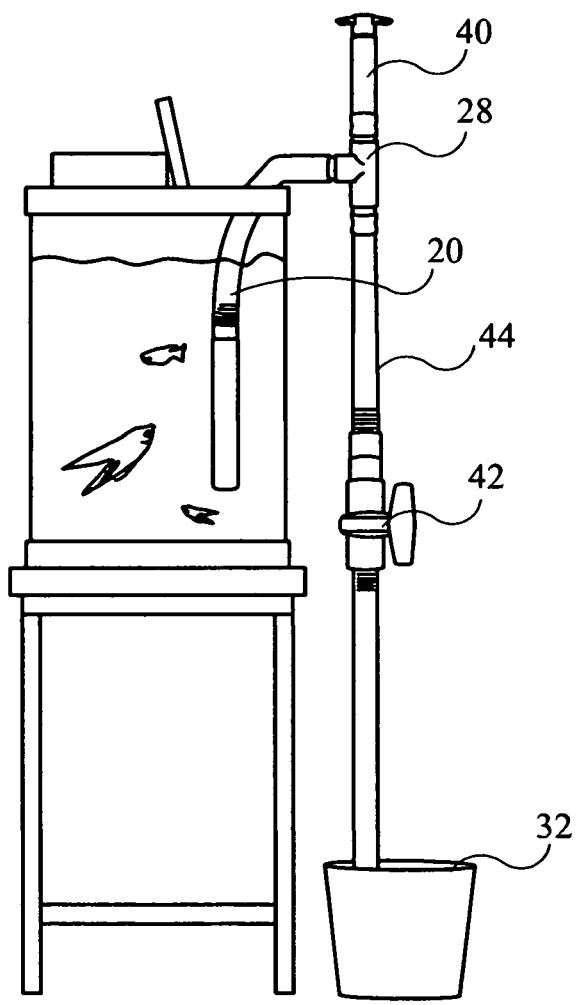
FIG. 13A-13B illustrate the Siphon Pump attached to the Aquarium with a Hood (using Straight Coupling and Siphon Hose (extension) to reach bucket) in an embodiment of the present invention.
Figure 23:
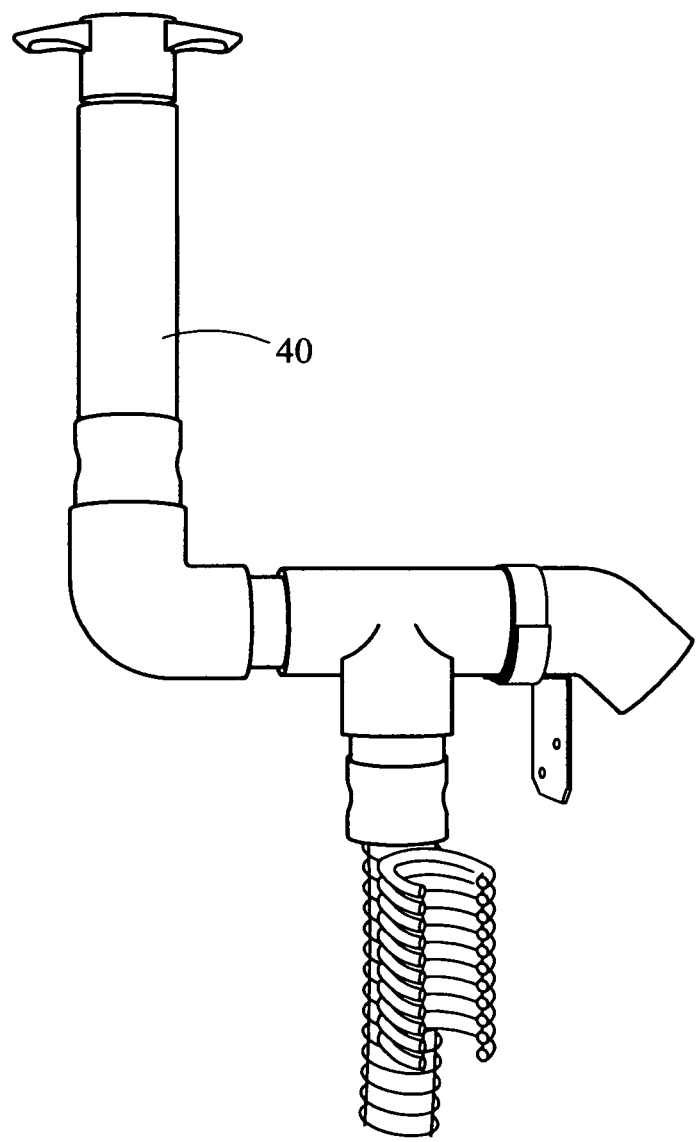
FIG. 23 illustrates an alternate embodiment of a pump configuration in an embodiment of the present invention.
Figure 24:
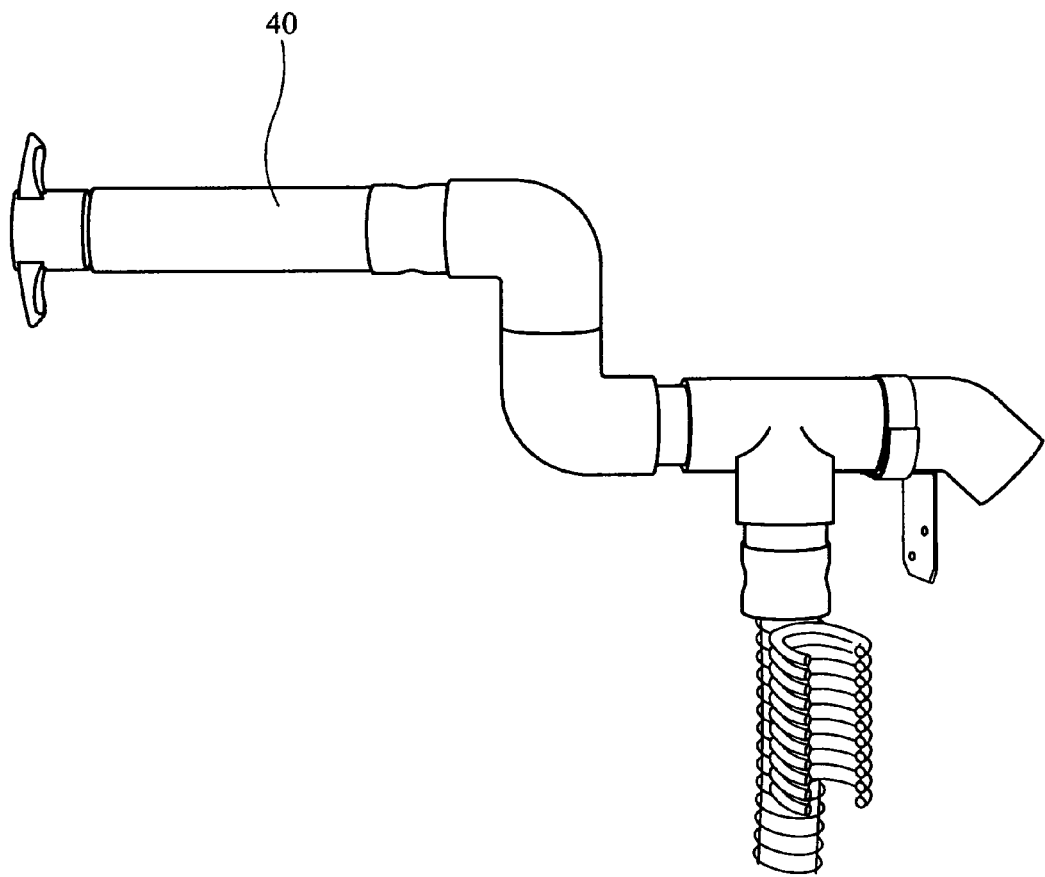
FIG. 24 illustrates a further alternate embodiment of a pump configuration in an embodiment of the present invention.
Figure 25:
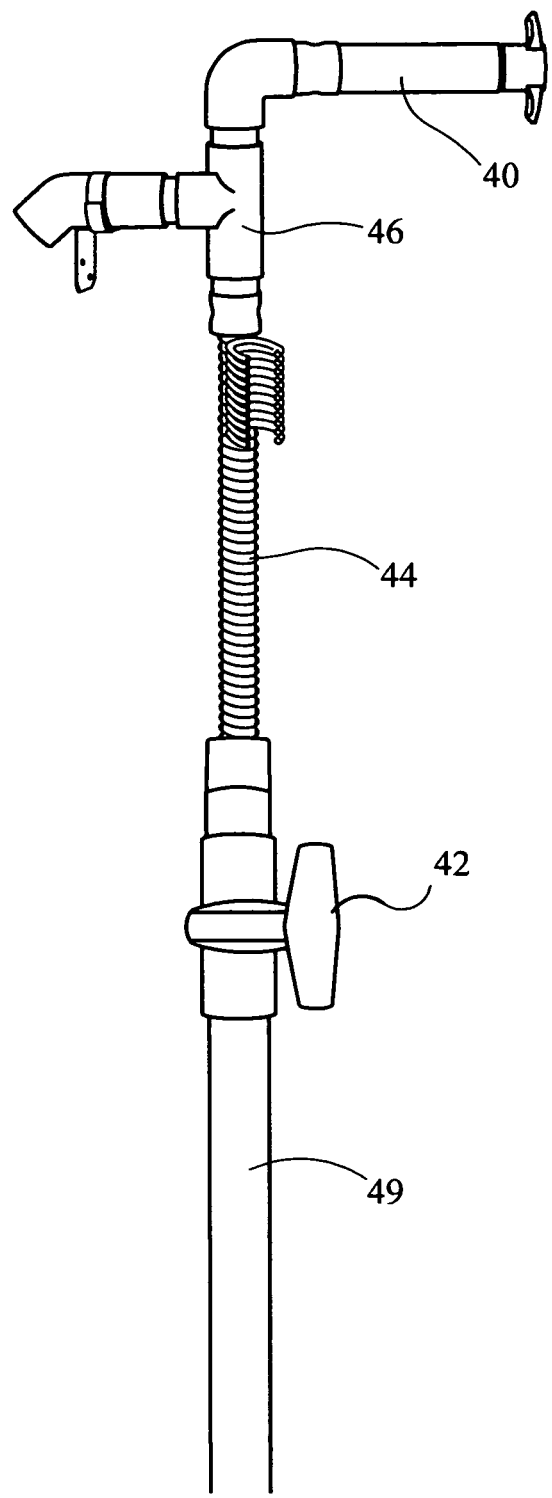
FIG. 25 illustrates a still further alternate embodiment of a pump configuration in an embodiment of the present invention.

FIGS. 23-25 illustrate alternate embodiments of Siphon Pumps having different orientations of Siphon Starter Pumps 40, depending on where or how the Siphon Starter Pump 40 may be stored or utilized with the ACS of the present invention. For example, the Siphon Starter Pump 40 may be directly connected to the Siphon Junction 46, as illustrated in FIG. 13A. Alternatively, the Siphon Starter Pump 40 may be connected to the Siphon Junction 46 via one or more 90 degree couplings, as illustrated in FIGS. 22-25. FIG. 25 illustrates a Rigid Siphon Tube 49 that may be disposed within a bucket or other receptacle for collecting water and waste from an aquarium.

Figure 14:
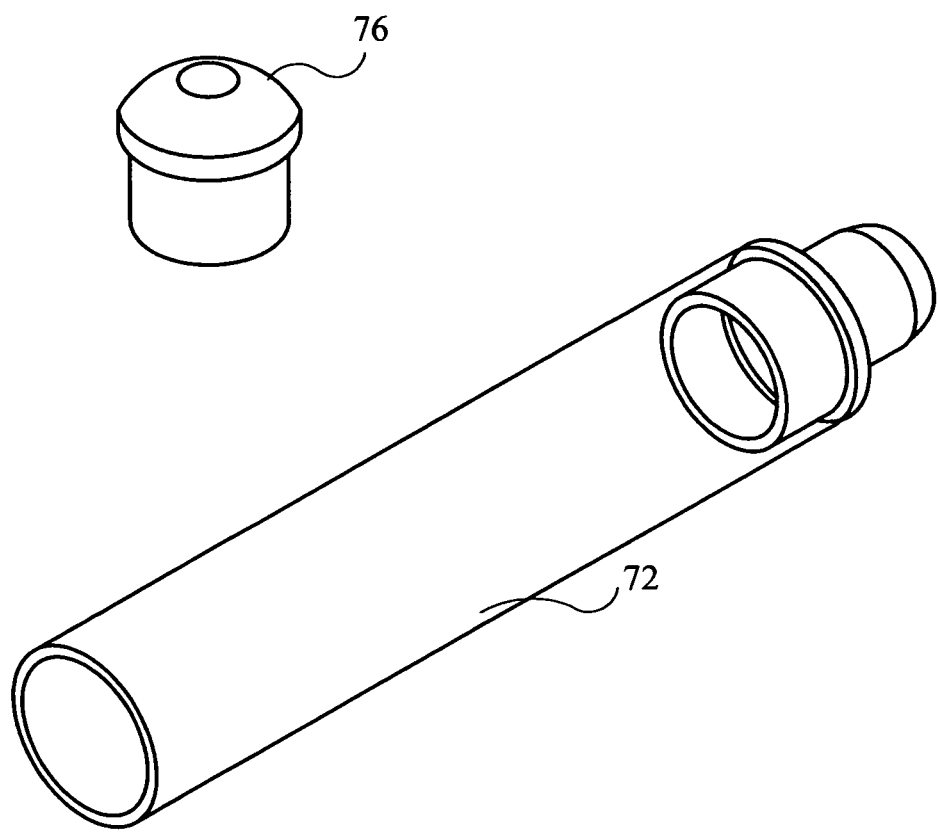
FIG. 14 illustrates Gravel Vacuum System Components in an embodiment of the present invention.
Figure 15:
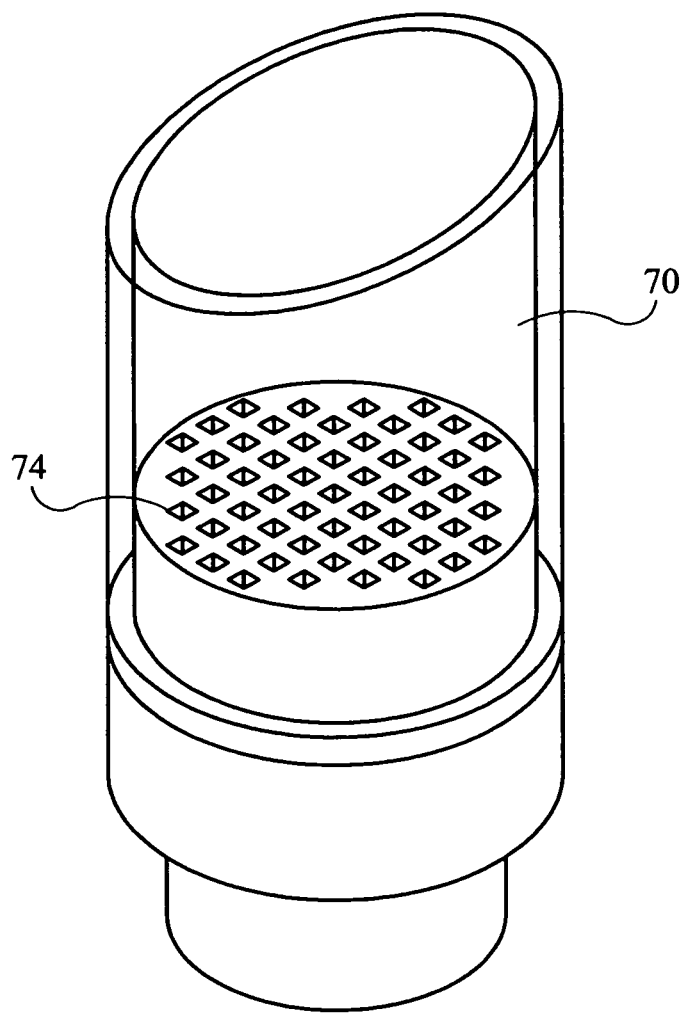
FIG. 15 illustrates a close-up view of the Gravel Vacuum System Components in an embodiment of the present invention.
Figure 16:
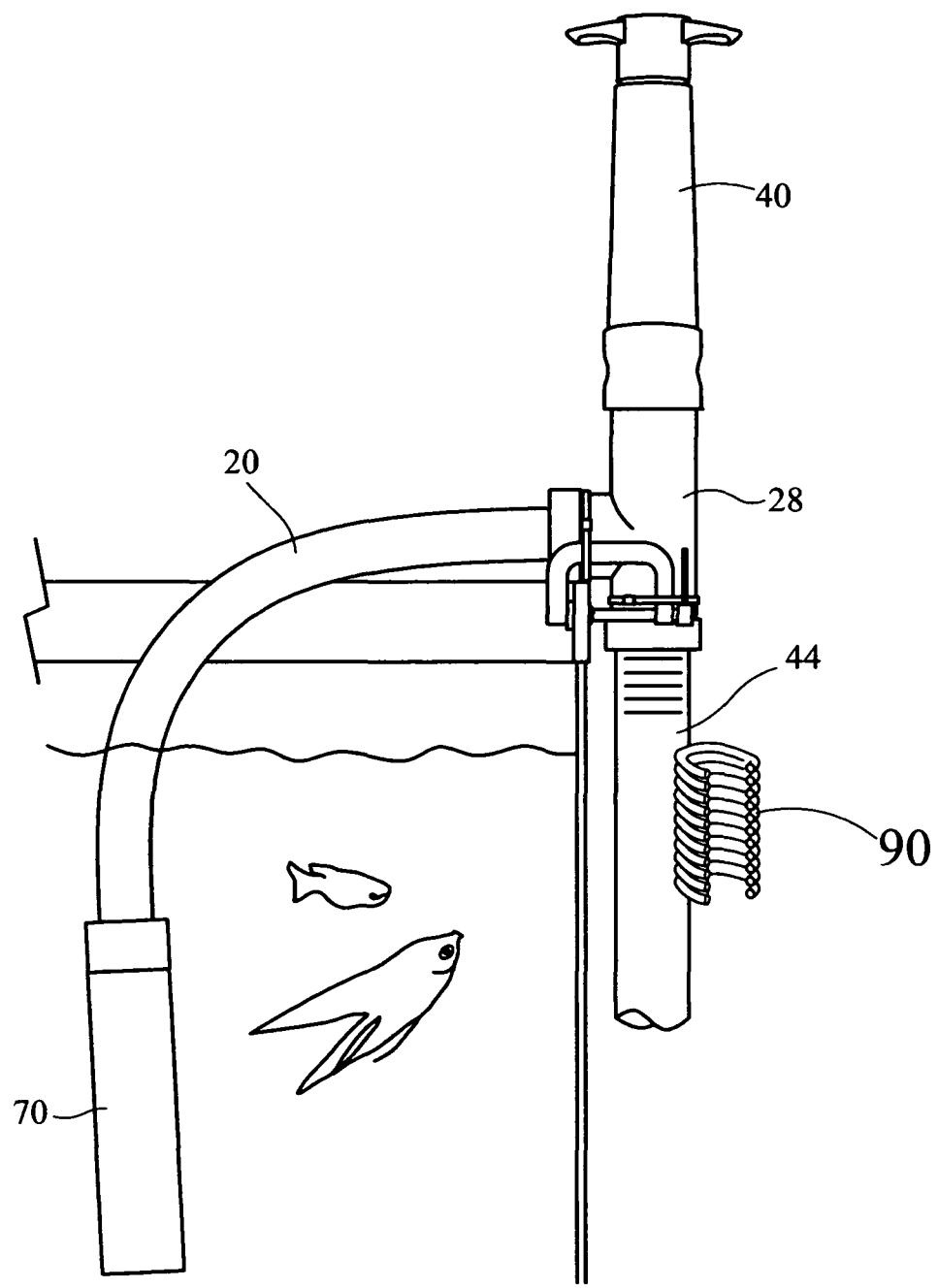
FIG. 16 illustrates components of the Gravel Vacuum System in an embodiment of the present invention.

The system 10 may also work in "Gravel Vacuum Mode", whereby the SP 28 may be utilized with a free vacuum tube apparatus that may be used to clean the tank of waste and debris, and may be manually manipulated by a user above the gravel. When the system 10 is acting in the Gravel Vacuum Mode, the MT 20 may be connected to the Siphon Pump 28, and an optional Gravel Vacuum System 70 (shown in FIGS. 14-16 may be attached to the opposite end from the Siphon Pump 28, for vacuuming the gravel as necessary. The Gravel Vacuum System 70 ("GVS"), as illustrated in FIGS. 14-16, may connect to the MT 20 to aid in vacuuming the tank. The Gravel Vacuum System 70 components may include a Debris Separation Tube 72 ("DST") where the debris may be separated from the gravel. The debris may be collected and may flow through the MT 20 and the Siphon Pump 28 where it may ultimately be collected in a bucket. A Fish Safety Screen 74 ("FSS") may be located at the top of the DST 72 to prevent fish being sucked through the MT 20. An adjustable Flow Restrictor Cap 76 ("FRC") may attach to the bottom of the Gravel Vacuum System 70. The adjustable Flow Restrictor Cap 76 may slow water flow to allow easy use of the gravel vacuum. The Flow Restrictor Cap may have a hole or opening, the hole or opening is adjustable to allow different rates of flow.

An alternate embodiment to restrict water flow during vacuuming of the aquarium is a Globe Valve (not shown) in place of the shut-off valve in the Siphon Pump 28 (not shown).

The MT 20 hose may be of sufficient length to reach all corners of the aquarium tank when vacuuming, and when used as a connector between the RCT 12 and the Electric Filter Pump 60 or as a connector between the RCT 12 and the Siphon Pump 28 provides sufficient length for the transportation of water.

To operate the Gravel Vacuum System 70, a user may attach one end of the MT 20 to the Siphon Pump 28 and the other to the Debris Separation Tube 72. The user may then start the siphon by implementing the siphon pump 28 and move the Debris Separation Tube 72 around within the gravel to remove debris.

Figure 13B:
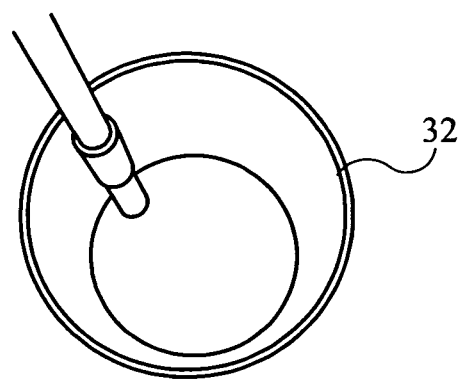

Referring to FIGS. 13A-13B, the MT 20 may be connected to the Siphon Pump 28 for delivery of the unclean water and waste to a Bucket 32. As illustrated in FIG. 13A. The siphon pump 28 may include a Siphon Starter Pump 40 that may be utilized to prime the Siphon Pump 28 to fill with water. A shut off valve 42 may be disposed beneath the Siphon Pump 28 and attached to the Siphon Hose 44. In use, the shut off valve 42 may be closed, and the Siphon Starter Pump 40 may be manually pumped to fill the MT 20 and the Siphon Hose 44 with water. Upon opening the shut off valve 44, a siphon may be created, whereby water and waste may flow from the aquarium to the bucket 32. If the MT 20 is attached to the RCT 12, the water and waste may be pulled from the Chamber. If the MT 20 is in Gravel Vacuum Mode, then the water and waste may flow from the Gravel Vacuum System 70.

Figure 8:
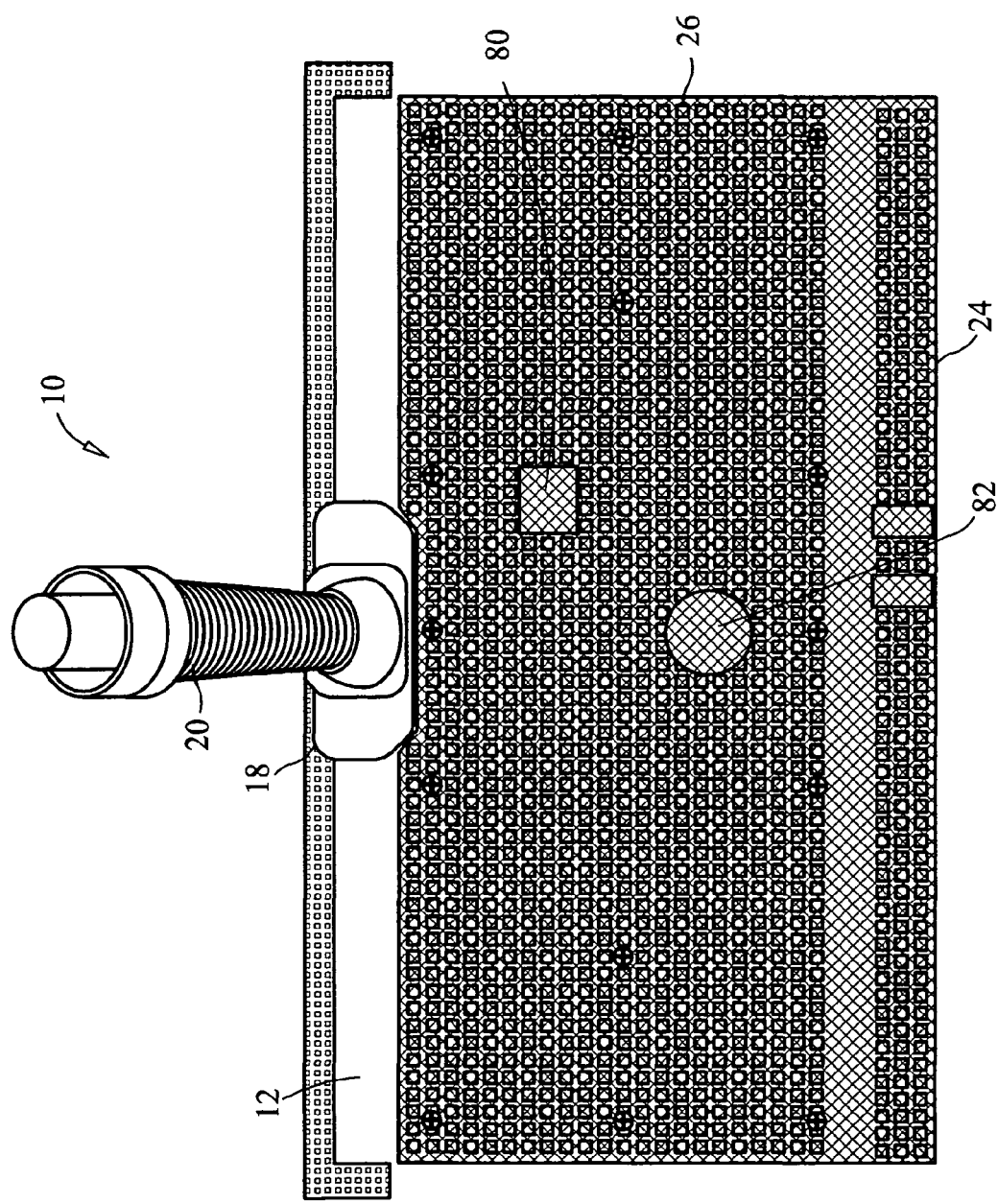
FIG. 8 illustrates an overhead view of the components of the present invention in an embodiment thereof.
Figure 9:
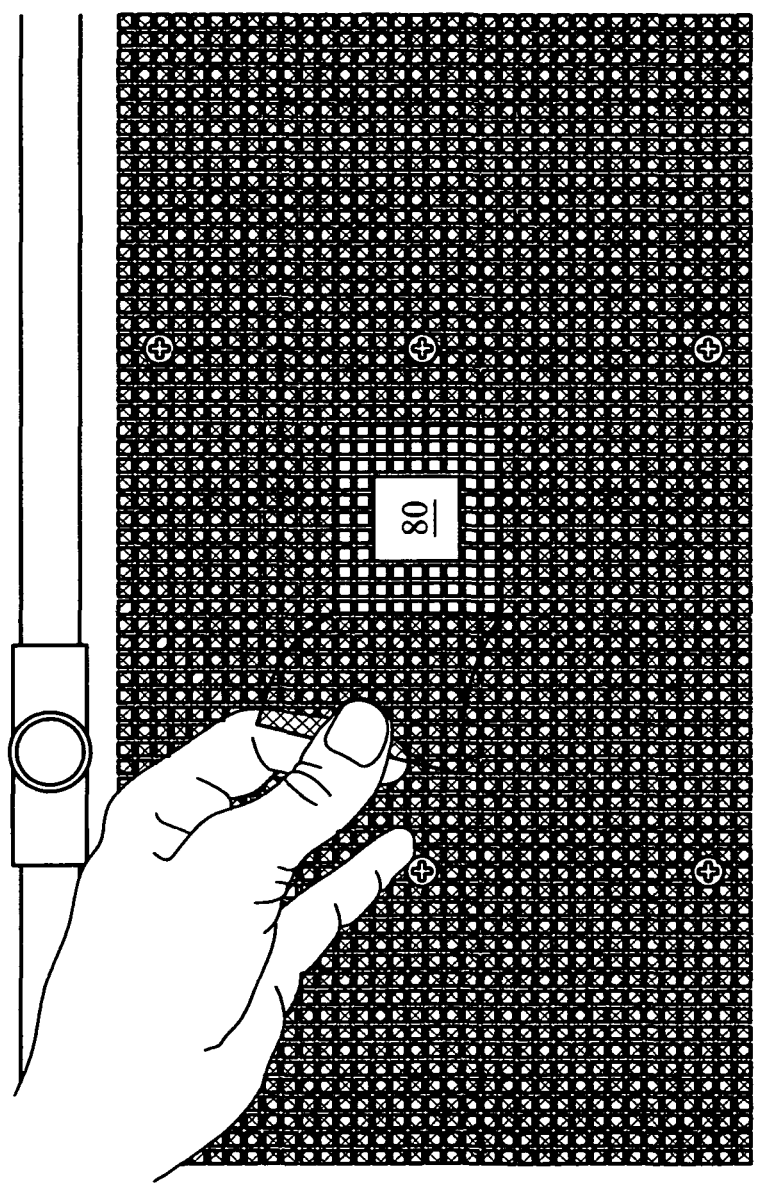
FIG. 9 illustrates an overhead view of a trap door in the grill in an embodiment of the present invention.

Referring now to FIGS. 8 and 9, an embodiment of the present invention is shown and described. Specifically, FIG. 8 illustrates an overhead view of the system 10 of the present invention, including the RCT 12, the RCTC 18 and the MT 20 for removing waste and debris that may fall into the Chamber 26 disposed beneath the grill 24. In the embodiment shown in FIGS. 8 and 9, a trap door 80 may be disposed within the grill 24 to obtain access to the Chamber 26 thereunder. FIG. 9 illustrates the trap door 82 opened to gain access to the Chamber 26.

A Magnetic Floor Scraper ("MFS") 82 may be disposed within the Chamber 26 beneath the Grill 24. The MFS may be comprised of two components and used to clean the aquarium tank. The first component may be a Chamber Magnet ("CM"); the Chamber Magnet may be placed on the aquarium tank floor. The second component may be an Outer Magnet ("OM") (not shown) that may be located on the outside of the aquarium tank on the side opposite the Chamber Magnet. As the Outer Magnet is moved, the Chamber Magnet may follow on a corresponding path. The Chamber Magnet may be in contact with the aquarium tank floor in the Chamber and as it moves, it may loosen the debris accumulated on the floor of the aquarium tank inside the Chamber. The Outer Magnet may have an optional extension rod for ease of handling. The Chamber Magnet and the Outer Magnet may be coated on their respective surface to not scratch the aquarium tank. The Chamber Magnet may be encased in a plastic coating that may provide for easy movement along the aquarium floor and may prevent the Chamber Magnet from rusting. A "scoop" can be added to the Chamber Magnet for positioning debris in the Chamber, and therefore easier removal of the debris. The scoop may have a unique shape that may help trap the debris and may be in communication with a semi-enclosed compartment for retaining the debris being removed.

Figure 10:
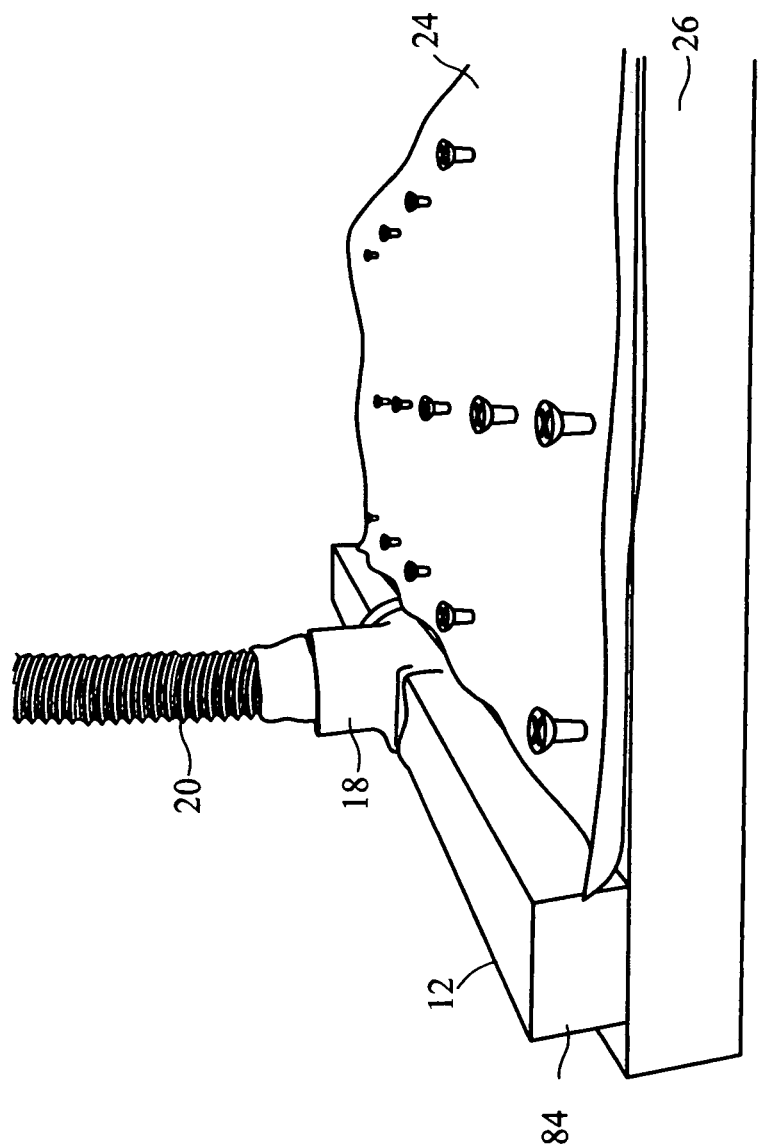
FIG. 10 illustrates a side view of components of the present invention including an RCT-end cap, in an embodiment thereof.
Figure 11A:
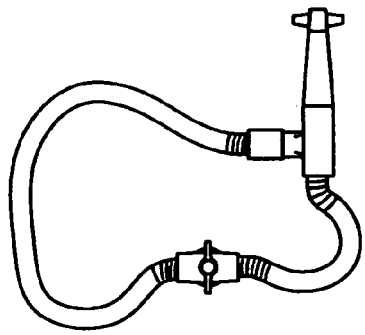
FIGS. 11A-11D illustrate a Siphon Pump coiled for compact storage and transportation, in an embodiment of the present invention.
Figure 11B:
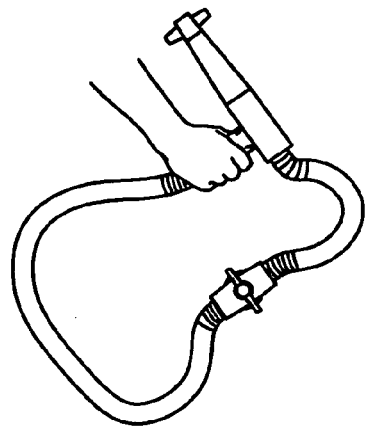
Figure 11C:
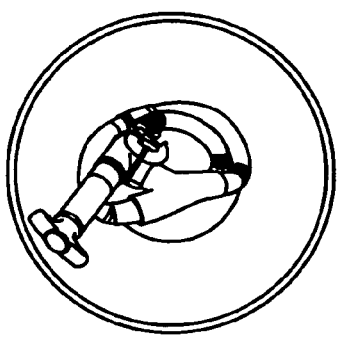
Figure 11D:
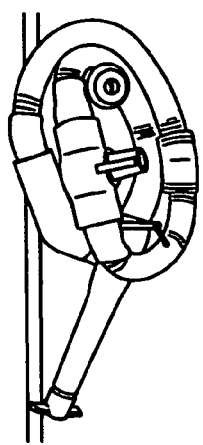

FIG. 10 illustrates a side view of the system 12, including the RCT 12, the RCTC 18, the Grill 24 and the Chamber 26 disposed beneath the Grill 24. The RCT is illustrated, in FIG. 10, as a rectangular prism having a length that generally covers an entire side of the aquarium. Waste slits (not shown) may be disposed in the RCT 12 for pulling water, waste and debris from the Chamber 26 when the siphon process is activated. Further, as illustrated in FIG. 10, RCT End-Caps 84 may be provided to seal the ends of the RCT 12 so that all water, waste and debris may flow through the waste slits (not shown), providing full and efficient removal of the waste and debris within the Chamber 26.

Depending on the aquarium tank setup, the aquarium tank, as used in the present invention, may be situated on Tank Support Legs ("TSL") or a Base. The TSL or Base provides support for the aquarium tank so that the Outer Magnet may be moved around on the Chamber floor and with the optional extension rod provides a "fuller" cleaning of the aquarium tank floor in the Chamber. The TSLs may be positioned to provide for the necessary balance of the aquarium tank, decorative articles or ornaments can be attached to the TSLs to further highlight the aquarium setting.

Operation of the Present Invention

At the time to clean an aquarium, the first step may be to affix the Siphon Pump 28 to the side of the aquarium and then connect the Siphon Pump 28 to the RCT 12 through the MT 20. The second step may be to place a shut-off valve on the Siphon Pump 28 in a closed position. The third step may be to pump the Siphon Pump until the MT 20 fills with water above the shut-off valve. The fourth step may be to open the shut-off valve of the Siphon Pump 28 so the siphon may begin and the water may flow and may automatically flush the debris from the Chamber 26 into the bucket. To stop the siphon, the user may remove the siphon pump 28 from a siphon junction, as illustrated in FIGS. 11 and 12. This may thus introduce air into the Siphon Junction 46, which will stop the siphon. The system 10 of the present invention may remove five (5) gallons of water into a bucket in approximately 25 seconds; however, the precise time for removing the water is subject to a host of factors and cannot be predicted with perfect accuracy. The water flow generated by the Siphon Pump 28 may create enough suction to pull debris trapped in the gravel into the Chamber 26 and, therefore, out of the Chamber through the MT 20.

Setup for Large Tanks

For aquariums larger than 36 inches long, a dual side-by-side system setup may be necessary. As an example, a 55-gallon aquarium, with a 48-inch by 12-inch tank, two (2) identical 24 inch by 12-inch units of the present invention may be installed side by side, separated by a Chamber Divider ("CD") (not shown). The Chamber Divider may thus split the 48-inch long tank into two (2) independent 24-inch Chambers.

Figure 6:
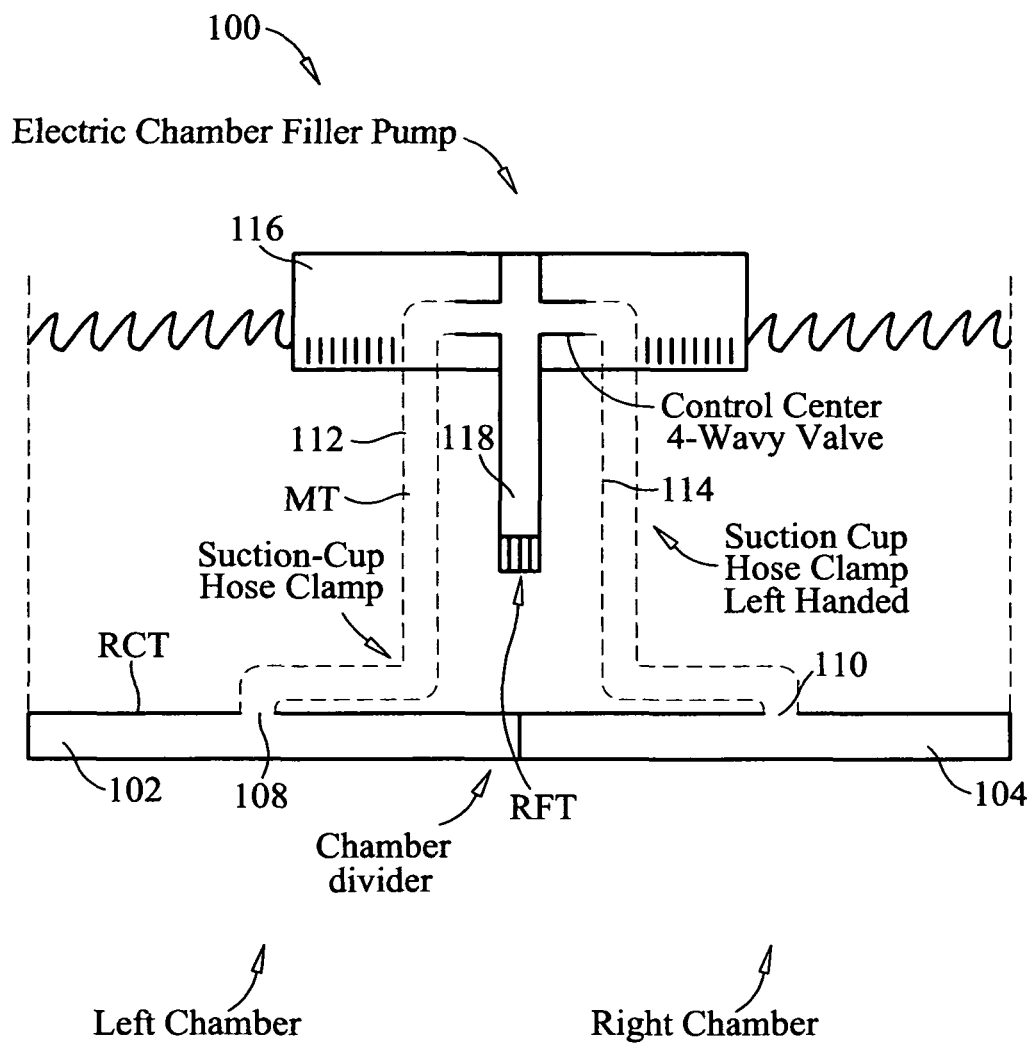
FIG. 6 illustrates a diagram of an embodiment of the present invention showing the water flow with optional the Electric Chamber Filter Pump.

FIG. 6 illustrates a side-by-side system 100, in an embodiment of the present invention. Specifically, the side-by-side system 100 may include a first RCT 102 and a second RCT 104 disposed side by side, and having a chamber divider 106 disposed therebetween. A first RCTC 108 may extend from the first RCT 102 and a second RCTC 110 may extend from the second RCT 104. A first MT 112 may extend from the first RCTC 108 and a second MT 114 may extend from the second RCTC 110. Each of the first and second MTs 112, 114 may be connected to an electric chamber filter pump 116, or, alternatively, to one or more siphon pumps (not shown) and may generally operate as disclosed above with the system 10. Using the electric chamber filter pump 116, however, the filtered water may be recirculated back into the aquarium through a Rigid Filter Tube 118. In addition, the first and/or second MTs 112, 114 may be removable and, preferably, capped or otherwise provided with a screen or other restrictive element to prevent the entry of material into the first and/or second RCTs 102, 104.

Connecting the two (2) ACS units together is the Master Control Center ("MCC") valve which is a 4-way "mixing" valve that provides seamless integration of the two (2) or dual ACS units, so the units function as one. The Master Control Center is illustrated in FIG. 7A and the operation thereof is illustrated in 7B.

The MT 20 may connect each of the units to the MCC valve. Different valve configurations may be possible, including the use of a three-way valve.

The Rigid Filter Tube ("RFT") 118 may screw into the Master Control Center ("MCC") valve and may filter the aquarium water. Suction Cup Hose Clamps ("SCHC") may secure the MT 20 to the aquarium tank or RCT 12. The SCHC allows the MT 20 to maneuver freely around the aquarium tank.

The bucket used to capture debris from within the aquarium tank may be used for other household chores such as a watering bucket for household and garden plants, due to the high nitrate content of the aquarium water.

Referring now to FIGS. 26-29, various embodiments of buckets are shown and described herein. One purpose of the bucket is to allow the user to remove water and waste from an aquarium tank without any lifting or spilling. The bucket may be sized in various sizes to accommodate different sized tanks. The bucket may also be on wheels for easy mobility.

Figure 26:
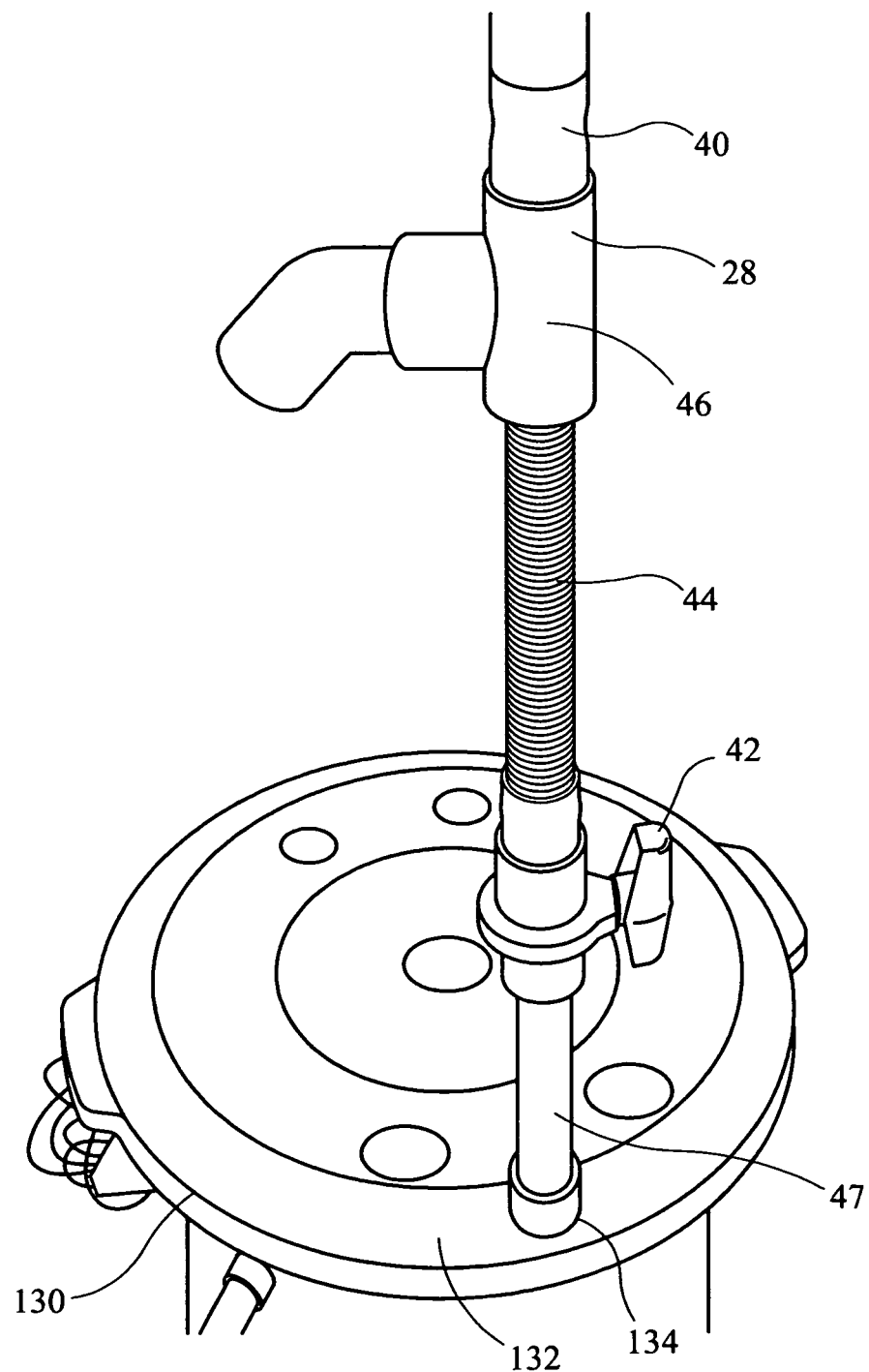
FIG. 26 illustrates a perspective view of a Commercial Bucket in an embodiment of the present invention.

Another embodiment of a bucket 130 is shown in FIG. 26. The top of the bucket 130 may have a lid 132 with an opening 134 located near a side of the lid 132. The opening 134 in the lid 132 may be sufficiently sized to let the bottom of a Rigid Siphon Tube 47 in and let enough air-pressure out for proper function of the siphon. The lid 132 may be removable and may be used to keep water from spilling or splashing while cleaning the tank. When the Siphon Pump 28 is not in use, the opening 134 in the lid 132 may be plugged to prevent water from spilling or splashing while transporting or storing the bucket. The lid 132 may be transparent so the user can see the water level. The bottom of the Rigid Siphon Tube 47 may slide down into the bucket. The bottom of the bucket may be angled to create a "Collection Point" ("CP") (not shown) for all the water therein.

Figure 27:
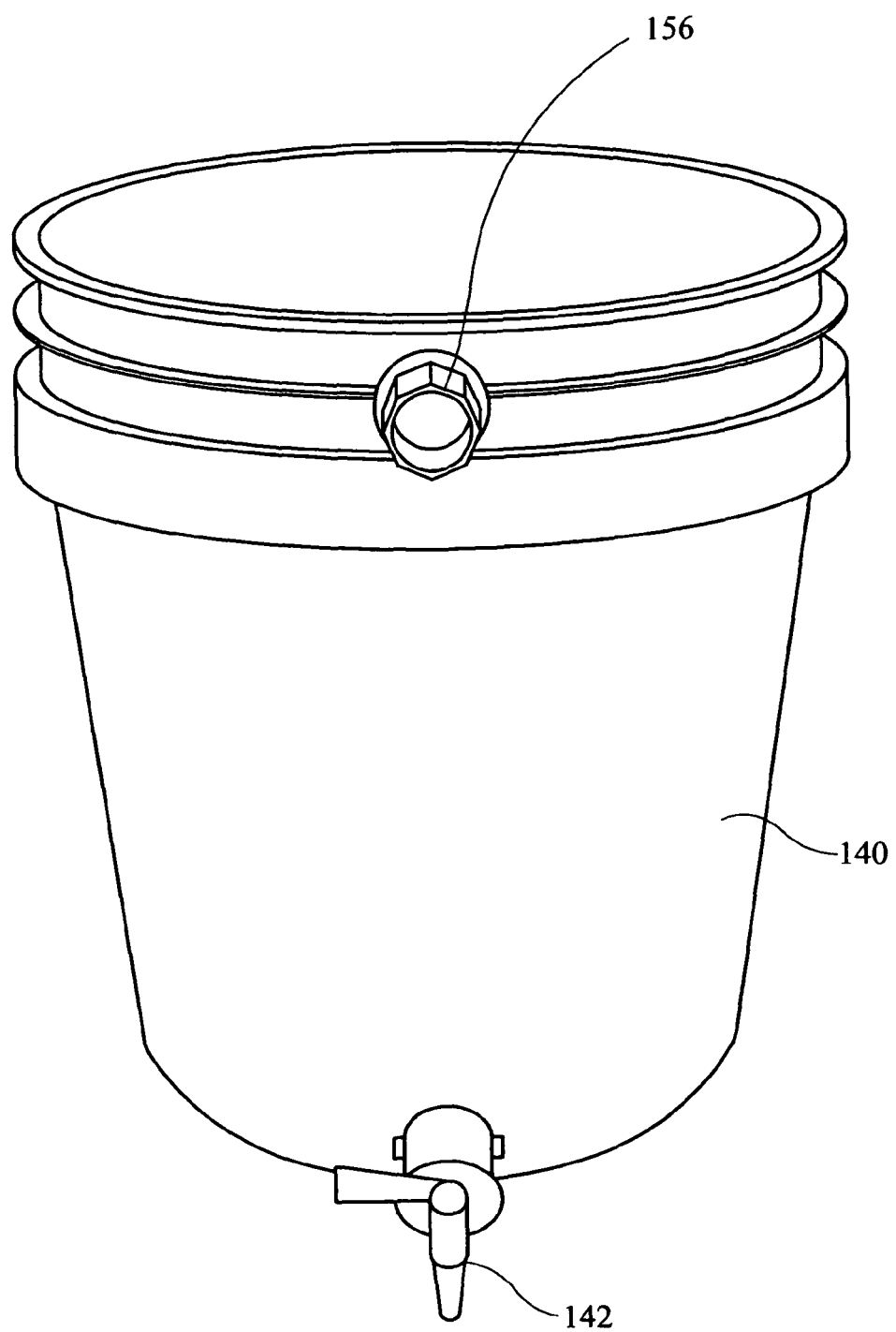
FIG. 27 illustrates a perspective view of a Consumer Bucket in an embodiment of the present invention.
Figure 28:
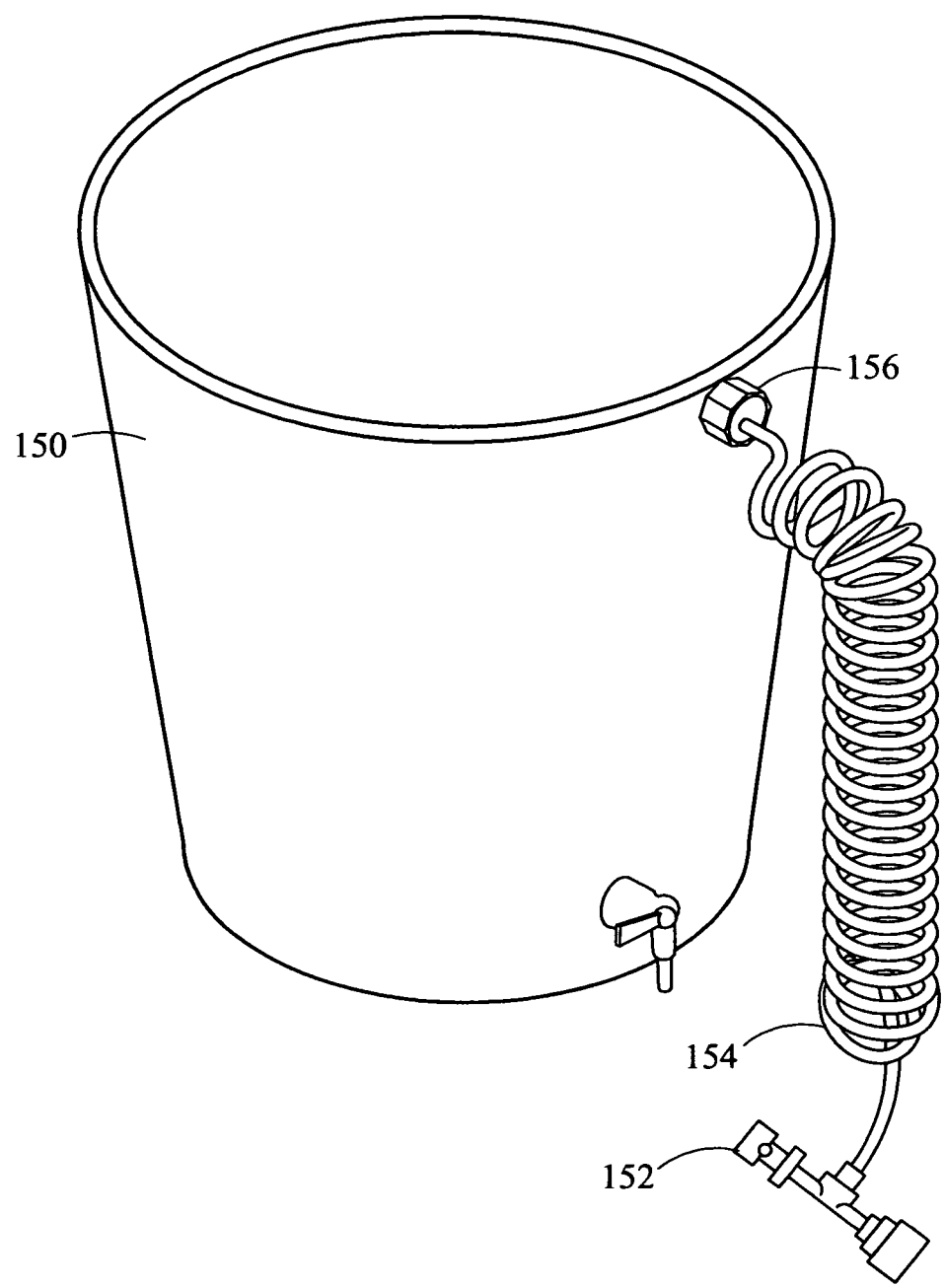
FIG. 28 illustrates an alternate view of the Consumer Bucket in an embodiment of the present invention.
Figure 29:
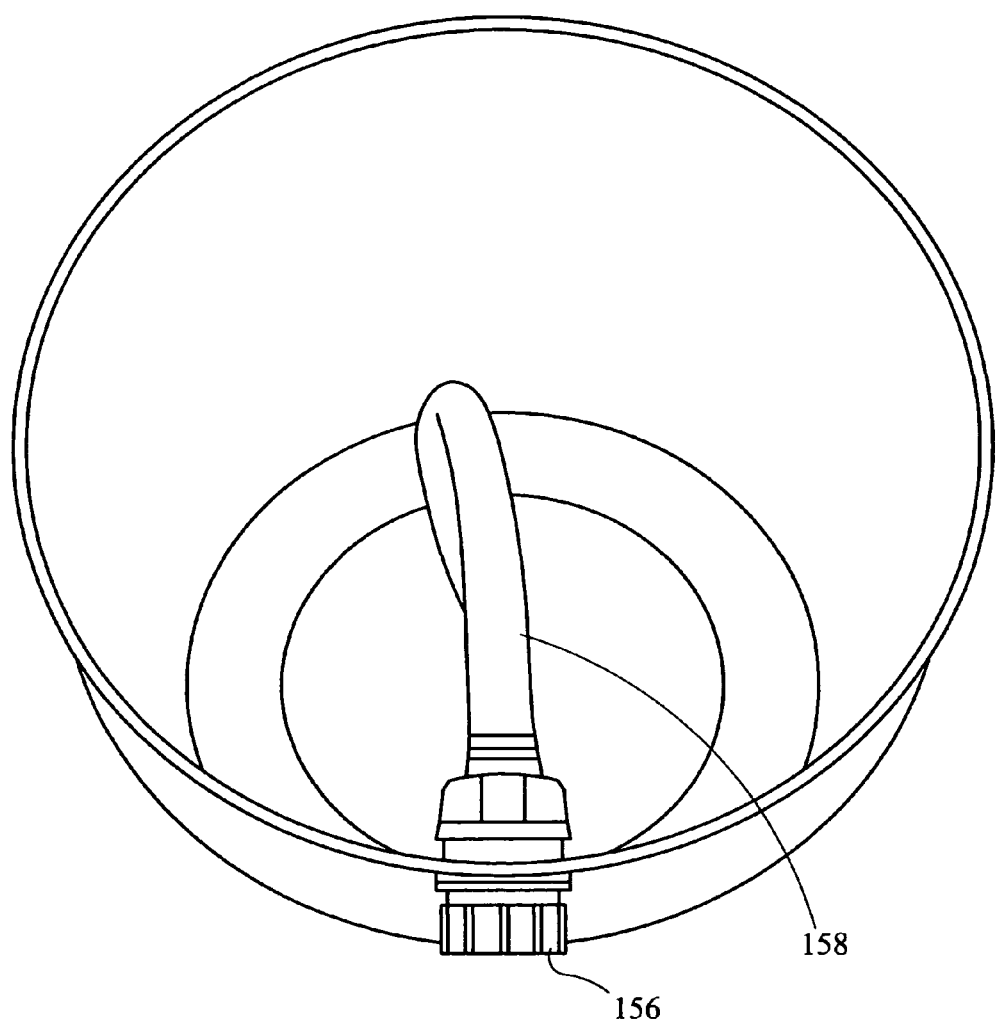
FIG. 29 illustrates an overhead view of a Consumer Bucket in an alternate embodiment of the present invention.

Water may be removed from the bucket in one of three methods. The first method may be shown by bucket 140, as shown in FIG. 27. Water may be removed through a spigot 142 located at the bottom of the bucket 140. In the second method, as shown by bucket 150 in FIG. 28, the water may be removed from the bucket 150 with a water aspirator pump 152. The aspirator pump 152 may be connected to a sink with a first end of a Hose 154 (regular or coiled) continuing from the aspirator pump 152 to the other or distal end of the hose 154, which may be screwed into the outside of a Hose Connector 156, the Hose Connector may be located near the top of the bucket 150. As shown in FIG. 29, a second hose or tube, called the Inner Bucket Hose 158 ("IBH"), may have a first end connected to the Hose Connector 156. The second end of the Inner Bucket Hose 158 may be positioned at a Collection Point within the bucket 150. When the water aspirator pump 152 is activated, the bucket 150 may begin to drain into the sink.

To fill the tank with water, one may simply unscrew the hose 154 from the bucket 150 and place it in the aquarium tank, close the aspirator pump 152, and the clean water from the faucet or other source may flow through the hose 154 and into the aquarium tank.

Figure 30:
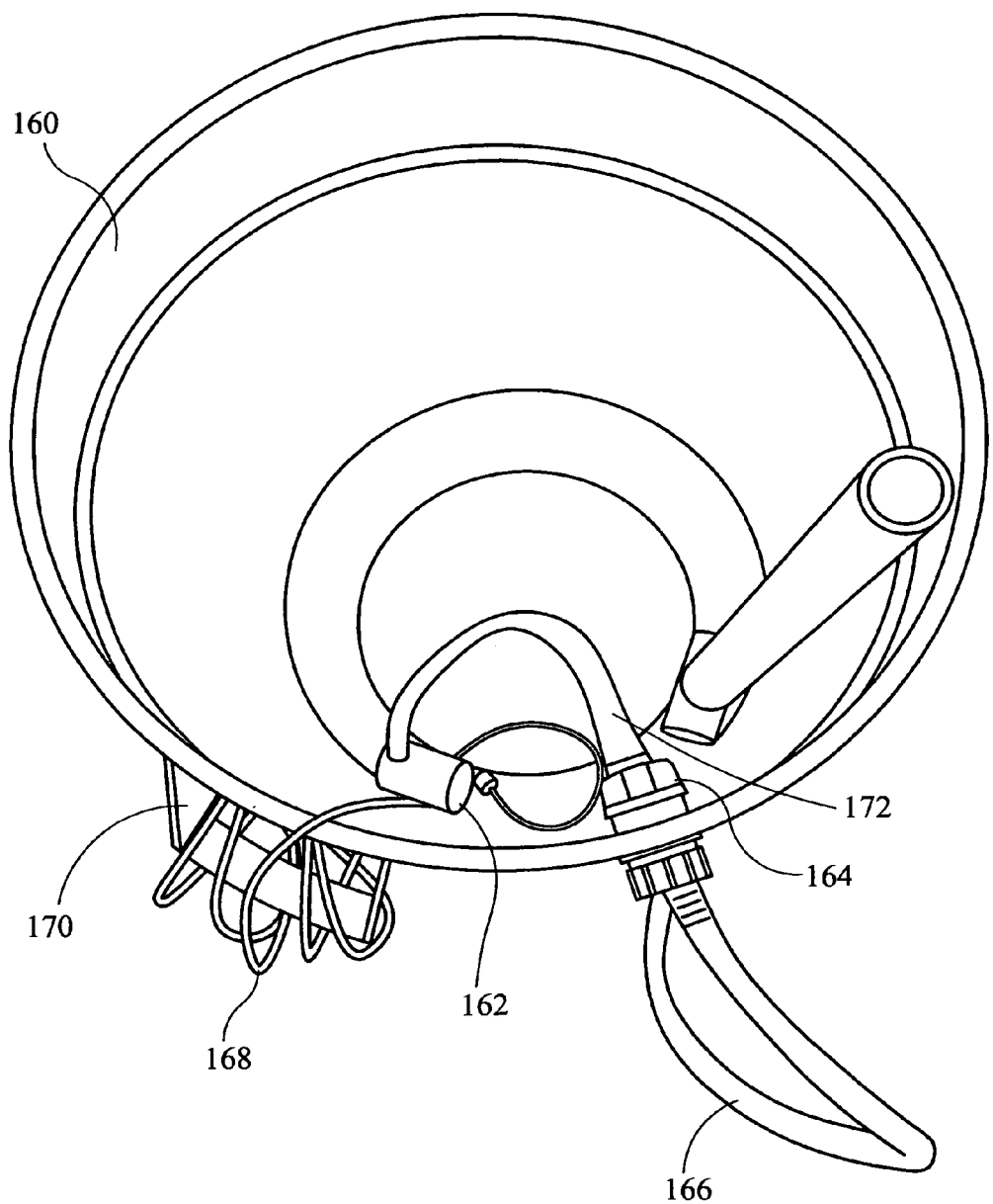
FIG. 30 illustrates an overhead view of a Commercial Bucket in an alternate embodiment of the present invention.

The third way to remove water from the bucket and refill the aquarium tank may be with a water pump 162 that may be disposed within bucket 160, as shown in FIG. 30. The water pump 162 may be installed at a Collection Point within the bucket 160 and may be connected to the Inner Bucket Hose ("INH"). The opposite end of the INH may be connected to a hose connector 164 located on the inside of the bucket 160. A first end of a regular hose 166 may be screwed into the outside of the Hose Connector 164. The second end of the hose 166 may be placed in a sink, toilet, flowerpot, garden, or wherever the user may want to dispose of the dirty water. A power cord 168 may run from the water pump 162 and may exit the bucket 160 just under the lid (not shown). The remainder of this cord may be stored in a Cord Reel 170 until such time one is to begin pumping water out of the bucket 160. When the power cord 168 is plugged into a power source, it may begin to pump water out of the bucket 160 through an internal hose 172 and then through the regular hose 166. When the bucket is empty, the pump 162 may automatically stop.

To refill an aquarium tank using this method, a first end of the regular hose 166 may be screwed onto the sink faucet, which may be fitted with a hose adaptor, and the second end of the regular hose may be screwed in to the hose connector 164 in the bucket wall. When the sink faucet is turned on, the water from the faucet may fill the bucket 160. To refill the tank, one may simply unscrew the hose from the sink faucet, and may place this first end of the regular hose inside of the aquarium tank and plug the water pump 162 into a power source.

A battery operated water pump may be used to perform these functions for greater mobility. A Water Redirection Cone ("WRC") (not shown) may be screwed onto the end of the hose to evenly disperse water into the tank. The WRC may disperse the water in 360 degrees, so the gravel or tank ornaments may not be disturbed.

Alternatively, there may be a bucket design for commercial applications. This alternative bucket design may be useful in commercial environments where tanks that are at different heights need to be cleaned, and the environment requires that no water spills occur. This alternative bucket design may be larger than the regular bucket used. This alternative bucket design may also be used for consumers who have very large aquarium tanks.

Figure 31:
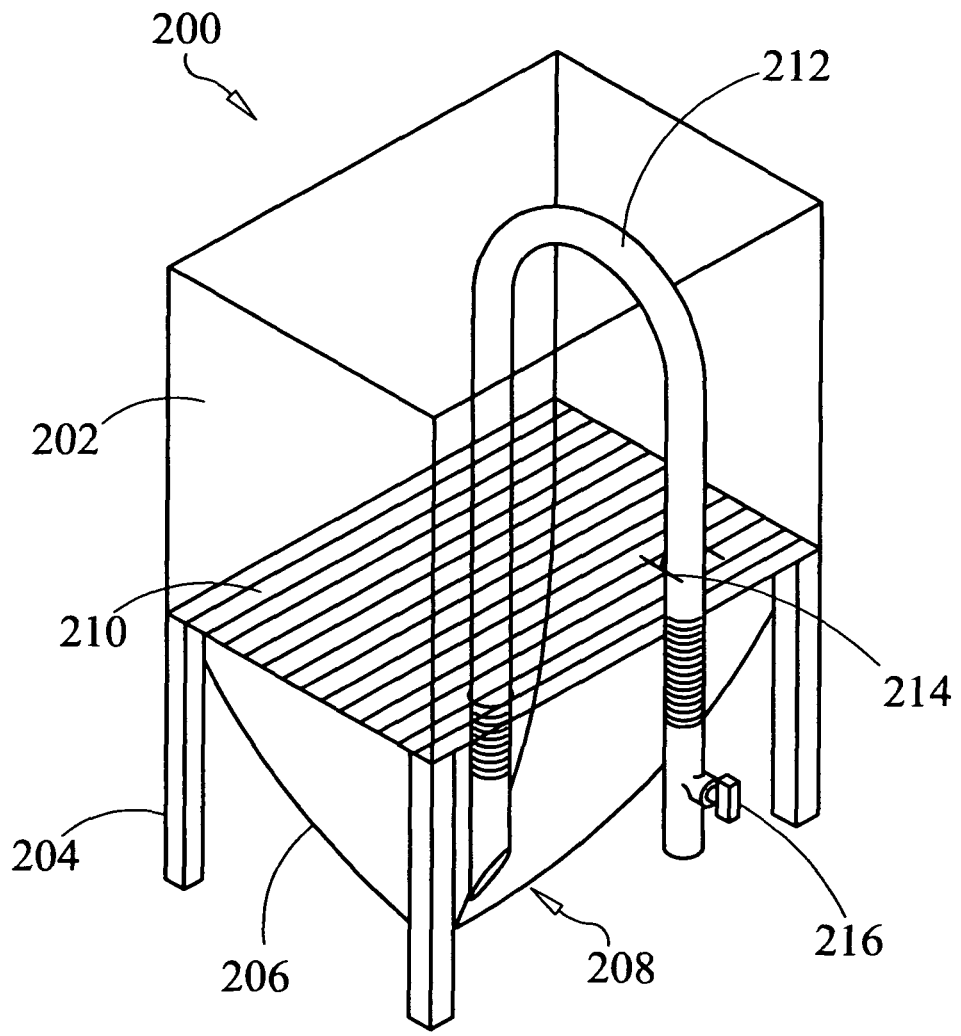
FIG. 31 illustrates a Desktop ACS system in an embodiment of the present invention.

Referring now to FIG. 31, an alternate embodiment of the present invention is shown and described. Specifically, FIG. 31 illustrates a desktop aquarium system 200 that may be utilized to ensure a clean and safe environment for aquatic animals contained therein. The system 200 may include an aquarium 202 having a plurality of legs 204 that may be utilized to keep the aquarium 202 in an upright position. Within the aquarium 202 may have a sloped chamber 206 within the aquarium 202 and disposed at the bottom thereof. The chamber 206 is sloped downward creating, toward a bottom corner of the aquarium 202, a collection point 208 for the collection of debris and waste from within the aquarium 202 and aquatic animals that may be contained therein. Although shown in the corner, the collection point may be at any location within the chamber 206. Due to gravity, the debris and waste within the aquarium 202 may fall to the collection point 208.

A grill 210 may be provided above the chamber 206 and may define the chamber 206. The grill 210 may be a screen having holes therein to allow debris and waste to fall therethrough, but not other material within the aquarium, such as gravel, plants, ornaments, aquatic animals and the like. Specifically, the grill 210 may hold the gravel and ornaments above and away from the sloped chamber. Thus, the fish and/or other aquatic animals may reside above the grill 210.

Once the debris and waste from the aquatic animals passes through the grill 210, the debris and waste would fall to the collection point 208 and collect at the collection point 208. A siphon hose 212 may be located at or near the proximity of the collection point 208, either disposed above the collection point 208, or disposed beneath the collection point 208. As shown in FIG. 34, the siphon hose 212 is disposed above the collection point 208. When a siphon is created within the siphon hose 212, the siphon hose will pull the debris and waste out of the aquarium 202. The siphon hose 212 may be cut at an angle to provide a larger opening for the removal of waste and debris. For example, if disposed in a bottom corner of the tank, the siphon hose 212 may be cut at its terminal end near the collection point at a 45 degree angle to provide a wider mouth for the siphon hose 212, which may allow more waste and debris to pass therethrough.

The siphon hose 212 generally runs upwardly and out of the aquarium. Specifically, as shown in FIG. 31, the siphon hose 212 may run up and over the top edge of the aquarium 202, may U-turn downwardly and be attached to the side of the aquarium 202 via a holder 214 disposed on the side of the aquarium 202. Attached to an end of the siphon hose 212 may be a valve 216 that may manually be opened or closed to allow the siphon to activate and the water in the aquarium, as well as debris and waste, to get pulled out. The valve may be positioned at or near the location of the collection point 208, but outside of the aquarium.

When the valve 216 is opened, the water, as well as the waste and debris at the collection point 208, may automatically flow out of the aquarium 202 thereby cleaning the aquarium 202. In a preferred embodiment, the valve may be positioned above the collection point 208 near the bottom ⅓ of the tank. Thus, a ⅔ water change may easily be performed, as the water, waste and debris will continuously flow out through the siphon hose 212 until the water level in the aquarium reaches the exit opening in the valve 216. The valve may also be located above the grill 210 and any gravel, rocks, ornaments or the like, to avoid emptying too much water causing any aquatic animals to suffer or die from lack of water. It should be noted, however, that the valve 216 may be located at any position on the side of the aquarium 202 depending on how much water is desired to be removed from the tank 202.

Optionally, the valve 216 may simply be closed when the desired water level is reached. By closing the valve 216 while the siphon is still active, the siphon will remain ready to be activated automatically when the valve 216 is opened again. If the siphon stops because the water level drops below the level of the exit point on the valve, then an optional pump may be utilized to start the siphon process anew. In addition, the first time the siphon is started, a pump must be utilized to draw water up through the siphon hose 212. The pump may be a manual pump, an electric pump, or simply using one's mouth to suck water through the siphon hose 212 or by submerging the siphon hose 212 completely within the water until it fills completely.

In an alternate embodiment, the siphon hose 212 may be divided into several pieces that may be removed when not in use so that the components of the siphon hose 212, the valve 216 or other components are not readily apparent. In addition, a siphon starting pump may be utilized to start the siphon process, as noted above, and may be a modular component that may fit on the siphon hose 212 at any desired location. For example, the siphon starter pump may be a bulb that may be squeezed, thereby pulling water up the siphon hose 212 to start the siphon process.

Of course, the size of the aquarium 202 and the components thereof, as described herein, may be scalable and sized in any manner depending on the desire of the user. For example, the siphon hose 212 may be modular and/or expandable, depending on the amount of water desired to be removed from the aquarium 202.

While the present invention has been described above in terms of specific embodiments, it is to be understood the invention is not limited to these disclosed embodiments. Many modifications and other embodiments of the invention will come to mind of those skilled in the art to which this invention pertains, and are intended to be and are covered by both this disclosure.

We claim:

1. A system for cleaning an aquarium tank, the system comprising:
    a stationary first chamber comprising a bottom, at least one side wall, a grating forming a top thereof, and a space within the first chamber configured to catch debris falling through the grating disposed at the bottom of an aquarium containing an amount of water, the first chamber disposed over the entirety of the aquarium bottom and catching and holding debris that falls to the bottom of the aquarium;
    a second chamber disposed adjacent the first chamber, the second chamber comprising a plurality of passageways connecting the first chamber to the second chamber, the passageways configured to accelerate the flow of debris and water through the passageways when water and debris flow from the first chamber to the second chamber and further wherein each of the passageways form a space having a width larger than its height extending to the bottom of the aquarium;
    a stationary first tube extending upwardly from the second chamber and connected to the second chamber at a first end, wherein the first tube is configured to expel water from the second chamber out of the aquarium tank via a siphon.

2. The system of claim 1 wherein the second chamber comprises a tubular portion having a plurality of openings to allow the flow of debris therethrough and into the first tube.

3. The system of claim 1 further comprising:
    a screen covering the first chamber to allow debris to fall therethrough and into the first chamber.

4. The system of claim 3 wherein the screen blocks material other than debris from falling into the first chamber.

5. The system of claim 3 wherein the screen has a plurality of legs for propping the screen up above the first chamber.

6. The system of claim 1 wherein the first chamber extends from a first side of the aquarium to a second side of the aquarium.

7. The system of claim 1 comprising a pump configured to move water from the first stationary tube wherein the pump comprises a manual pump.

8. The system of claim 1 comprising a pump configured to move water from the first stationary tube wherein the pump comprises an electric pump.

9. The system of claim 1 wherein the aquarium comprises water and fish.

10. The system of claim 1 wherein the first tube is removable from the second chamber.

11. The system of claim 10 wherein a cap may fit over an opening formed when the first tube is removed from the second chamber to block the flow of material into or out of the opening.

12. The system of claim 1 further comprising:
    a filter interconnected with the stationary first tube, wherein the filter filters the debris.

13. A method of cleaning an aquarium comprising the steps of:
    providing an aquarium comprising water having a bottom and
    a stationary first chamber disposed at the bottom of the aquarium, the chamber comprising a bottom, at least one side wall, a grating forming a top thereof, and a space within the first chamber configured to catch debris falling through the grating to the bottom of the aquarium, the first chamber disposed over the entirety of the aquarium bottom and catching and holding debris that falls to the bottom of the aquarium, the aquarium further comprising a second chamber disposed adjacent the first chamber, the second chamber comprising a plurality of passageways connecting the first chamber to the second chamber, the passageways configured to accelerate the flow of debris and water through the passageways when water and debris flow from the first chamber to the second chamber and further wherein each of the passageways form a space having a width larger than its height extending to the bottom of the aquarium, the second chamber having a stationary first tube extending upwardly from the second chamber and connected to the second chamber at a first end, wherein the first tube is configured to expel water from the second chamber out of the aquarium tank via a siphon;

engaging a siphon on the first stationary tube;
pulling water and the debris from the entirety of the bottom of the aquarium through the second chamber and through the first tube; and
expelling water and the debris through a second end of the first tube.

14. The method of claim 13 wherein the aquarium further comprises a pump configured to move water from the first stationary tube wherein the pump is a manual pump.

15. The method of claim 13 wherein the aquarium further comprises a pump configured to move water from the first stationary tube wherein the pump is an electric pump.

16. The method of claim 13 wherein water expelled from the first tube is filtered using a filter mechanism and further comprising the step of: adding the filtered water to the aquarium after filtration thereof.

17. The method of claim 13 wherein water and debris are ceased from expelling through the first tube by a step selected from the group consisting of closing a valve disposed on the first tube, introducing air into the first tube, and any combination thereof.

* * * * *